United States Patent
Sun et al.

(10) Patent No.: US 12,232,069 B2
(45) Date of Patent: Feb. 18, 2025

(54) POLICY CONTROL FUNCTION NETWORK ELEMENT SELECTION METHOD, APPARATUS, SYSTEM, AND STORAGE MEDIUM

(71) Applicant: Huawei Technologies Co., Ltd., Shenzhen (CN)

(72) Inventors: Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 17/588,745

(22) Filed: Jan. 31, 2022

(65) Prior Publication Data

US 2022/0159606 A1  May 19, 2022

Related U.S. Application Data

(63) Continuation of application No. PCT/CN2020/103808, filed on Jul. 23, 2020.

(30) Foreign Application Priority Data

Jul. 30, 2019  (CN) .......................... 201910694362.8

(51) Int. Cl.
 *H04W 60/00* (2009.01)
 *H04W 8/08* (2009.01)

(52) U.S. Cl.
 CPC ............. *H04W 60/00* (2013.01); *H04W 8/08* (2013.01)

(58) Field of Classification Search
 CPC ....... H04W 60/00; H04W 8/08; H04W 8/065; H04W 8/12; H04W 76/11; H04W 8/06;
 (Continued)

(56) References Cited

U.S. PATENT DOCUMENTS 10,609,530 B1 *  3/2020  Patil et al. .............. H04W 4/50
10,856,217 B1 * 12/2020  Young et al. ......... H04W 48/18
(Continued)

FOREIGN PATENT DOCUMENTS

CN      101547462 A    9/2009
CN      107018542 A    8/2017
(Continued)

OTHER PUBLICATIONS (CN 110381548 B) >>> A Communication Method And Related Device (see title and description) (Year: 2021).*
(Continued)

*Primary Examiner* — Meless N Zewdu
(74) *Attorney, Agent, or Firm* — Conley Rose, P.C.

(57) ABSTRACT

A policy control function network element selection method, an apparatus, a system, and a storage medium, where a first access and mobility management function network element is configured to: receive a registration request message of the terminal device; obtain, based on an identifier of the terminal device in the registration request message, an identifier of a policy control function network element currently serving the terminal device and a network identifier of the policy control function network element; and when a network identifier of the first access and mobility management function network element is consistent with the network identifier of the policy control function network element, determine that the policy control function network element is a target policy control function network element.

20 Claims, 22 Drawing Sheets

(58) Field of Classification Search
CPC ......... H04W 28/0835; H04W 28/0838; H04W 28/0831; H04W 28/00; H04W 60/04; H04W 64/00; H04W 74/00; H04W 88/00; H04W 88/005; H04W 88/02; H04W 88/08; H04W 88/12; H04W 88/14; H04W 88/18; H04W 8/00; H04W 8/02; H04W 8/04; H04W 60/005; H04W 4/60; H04W 4/50; H04W 4/24; H04W 4/38; H04L 5/0053; H04L 5/00; H04L 41/0894; H04L 51/56; H04L 51/58; H04L 9/3268

See application file for complete search history.

(56) References Cited

U.S. PATENT DOCUMENTS

| | | | | |
|---|---|---|---|---|
| 2016/0065456 | A1* | 3/2016 | Muley et al. | H04L 45/38 |
| 2018/0048565 | A1* | 2/2018 | Yamada | H04L 45/74 |
| 2018/0192390 | A1 | 7/2018 | Li et al. | |
| 2018/0324577 | A1* | 11/2018 | Faccin et al. | H04W 8/06 |
| 2018/0367998 | A1* | 12/2018 | Kunz et al. | H04W 12/12 |
| 2019/0053010 | A1 | 2/2019 | Edge et al. | |
| 2019/0104535 | A1* | 4/2019 | Golitschek Edler Von Elbwart et al. | H04W 72/1268 |
| 2019/0251241 | A1* | 8/2019 | Bykampadi et al. | G06F 21/335 |
| 2019/0357129 | A1 | 11/2019 | Park et al. | |
| 2020/0037165 | A1* | 1/2020 | Kunz et al. | H04W 12/10 |
| 2020/0304983 | A1 | 9/2020 | Zhu et al. | |
| 2020/0344359 | A1 | 10/2020 | Sun et al. | |
| 2021/0258385 | A1* | 8/2021 | Wang et al. | |
| 2021/0360379 | A1 | 11/2021 | Wu et al. | |

FOREIGN PATENT DOCUMENTS

| | | | |
|---|---|---|---|
| CN | 108632887 A | 10/2018 | |
| CN | 109041149 A | 12/2018 | |
| CN | 109429362 A | 3/2019 | |
| CN | 109673005 A | 4/2019 | |
| CN | 109922472 A | 6/2019 | |
| CN | 109964509 A | 7/2019 | |
| CN | 110048867 A | 7/2019 | |
| EP | 3700241 A1 | 8/2020 | |
| EP | 3739920 A1 | 11/2020 | |
| KR | 20050012073 A | 1/2005 | |
| WO | 2006022518 A1 | 3/2006 | |
| WO | 2018174021 A1 | 9/2018 | |
| WO | 2019137553 A1 | 7/2019 | |
| WO | WO-2019138133 A1 * | 7/2019 | ........... C07D 231/12 |

OTHER PUBLICATIONS (CN 110249589 B) >>> A Communication Method And Device (see title and description) (Year: 2021).*
(CN 109756423 A) >>> Method And Device For Policy Update (see title and description) (Year: 2019).*
RU 2787848 C2) >>> Method, Device, and System for PCF Determination (see at least, title and abstract) (Year: 2023).*
(CN 110120882 A) >>> Policy-driven Method And Device (see title) (Year: 2019).*
(CN 110831088 A) >>> Strategy Control Method, Device And System (see title and description) (Year: 2020).*
(KR 20200108885 A) >>> Method, Device, And System For Configuring UE's Policy see title and description) (Year: 2020).*
(CN 110661630 A) >>> Distributing Method, Device And System Of Network Slice Instance (see title and description) (Year: 2020).*
Sun et al. (WO 2019137553 A1) >>> Method, Device, and System for Configuring Policy of UE (see title) (Year: 2019).*
Ryu et al. (CN 109891962 A) >>> Method And Network Device For Responding To The Request Of (see title) (Year: 2019).*
Wu et al. (CN 109673005 A) >>> A Method, Device And System For Determining PCF (see title) (Year: 2019).*
Ni et al. (WO 2019015419 A1) >>> Session Processing Method and Apparatus (see title) (Year: 2019).*
Samsung, "TS 23.502: Proactive notification of UE reachability toward SMF," SA WG2 Meeting #122Bis, Aug. 21-25, 2017, Sophia Antipolis, France, S2:-176082, 8 pages.
ZTE, Oracle, "23.502; Network Slicing Roaming Support (OI#2and OI#3)," SA WG2 Meeting #123, Oct. 23-27, 2017, Ljubljana, Slovenia, S2-177920, 20 pages.
3GPP TS 23.502 V16.1.1, "3rd Generation Partnership Project; Technical Specification Group Services and System Aspects; Procedures for the 5G System; Stage 2 (Release 16)," Jun. 2019, 494 pages.
3GPP TS 29.500 V16.0.0, "3rd Generation Partnership Project; Technical Specification Group Core Network and Terminals; 5G System; Technical Realization of Service Based Architecture; Stage 3 (Release 16)," Jun. 2019, 36 pages.
3GPP TS 33.501 V15.5.0, "3rd Generation Partnership Project; Technical Specification Group Services and System Aspects; Security architecture and procedures for 5G system (Release 15)," Jun. 2019, 190 pages.
Xu, Y., et al., "Deployment mode selection and evolution strategy of 5G network," Telecommunications Science, vol. 34, Issue 6, Jun. 20, 2018, 9 pages.
Ericsson, "Fixing text related to discovery and selection," 3GPP TSG-SA WG2 Meeting #130 Jan. 21-25, Kochi, India, Jan. 15, 2019, S2-1900083, 12 pages.

* cited by examiner

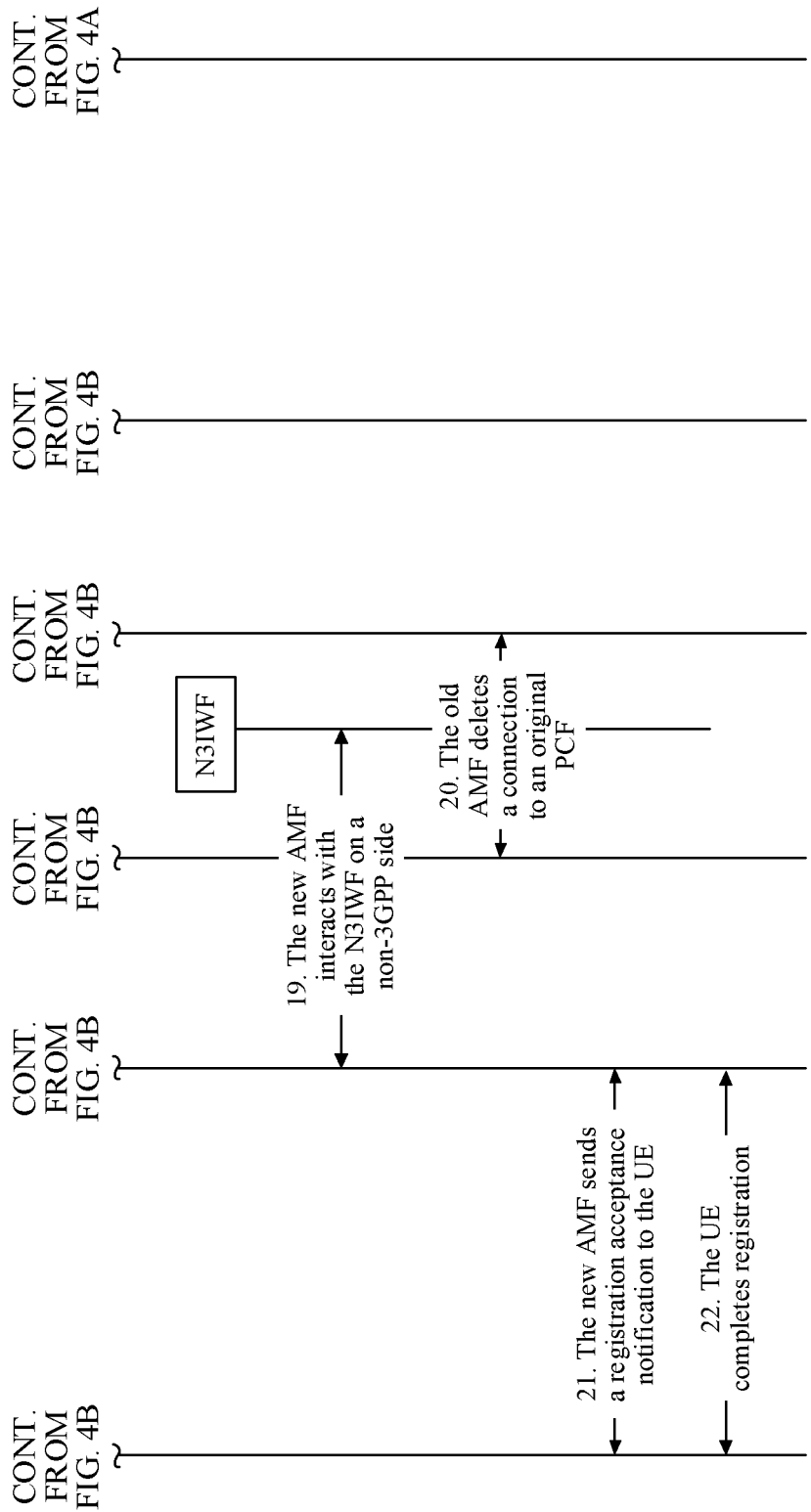

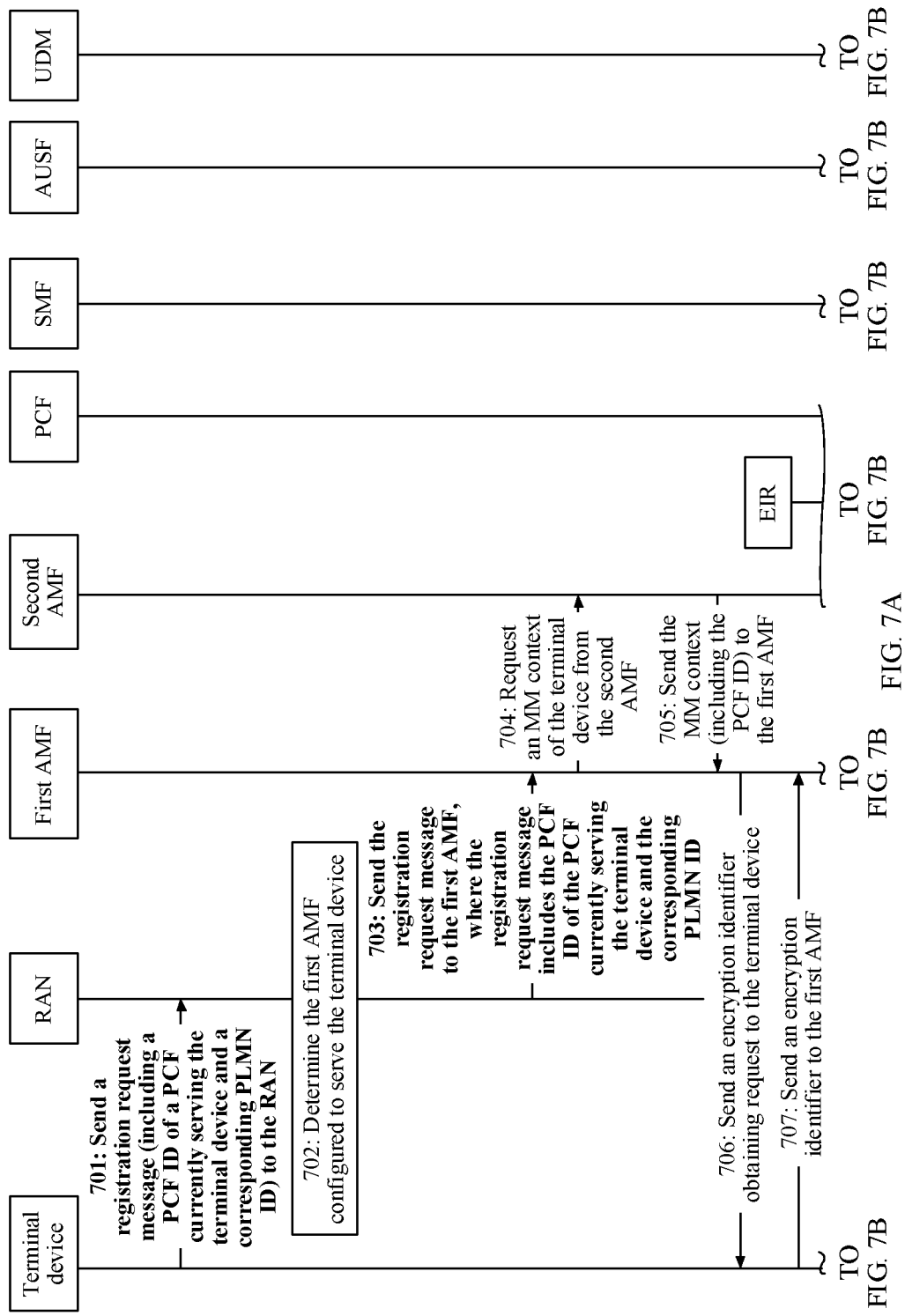

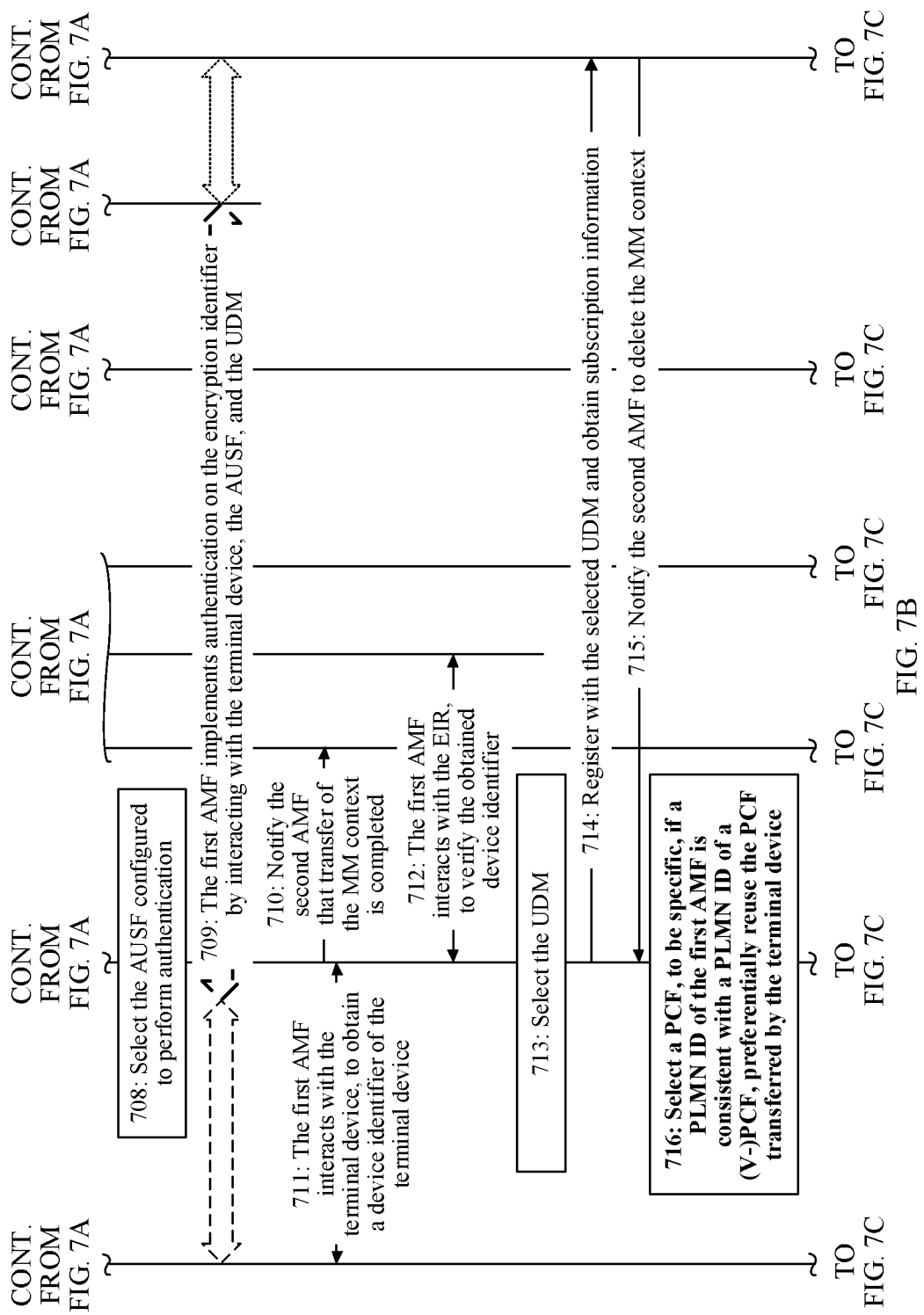

US 12,232,069 B2

POLICY CONTROL FUNCTION NETWORK ELEMENT SELECTION METHOD, APPARATUS, SYSTEM, AND STORAGE MEDIUM

CROSS-REFERENCE TO RELATED APPLICATIONS

This is a continuation of International Patent Application No. PCT/CN2020/103808, filed on Jul. 23, 2020, which claims priority to Chinese Patent Application No. 201910694362.8, filed on Jul. 30, 2019. The disclosures of the aforementioned applications are hereby incorporated by reference in their entireties.

TECHNICAL FIELD

This application relates to the field of communication technologies, and in particular, to a policy control function network element selection method, an apparatus, a system, and a storage medium.

BACKGROUND

At present, wireless communication technologies have been widely used in people's life. When a terminal device is initially used or when a region in which the terminal device is located changes, the terminal device needs to initiate a network registration request, to access a communication network. A dynamic policy is generally deployed in the communication network. In this way, when the terminal device initiates a registration procedure, an access and mobility management function (AMF) in the network performs a policy control function (PCF) selection procedure, to determine a serving PCF.

In a conventional technology, a procedure in which the AMF selects the PCF is as follows: The AMF interacts with a network repository function (NRF) to obtain PCF information in the communication network, and then selects the serving PCF based on the obtained PCF information. Then, the PCF is used to obtain policy information such as a policy section identifier (PSI) of the terminal device and policy content corresponding to the policy section identifier from a unified data repository (UDR), to implement policy control and management on the terminal device.

However, the policy information of the terminal device that is stored in the UDR does not change due to deregistration of the terminal device, but in an existing PCF selection method, the AMF selects a PCF each time the terminal device initiates a registration procedure, and then the selected PCF is used to obtain the policy information of the terminal device from the UDR. As a result, the policy information of the terminal device is repeatedly accessed, and a signaling waste problem exists.

SUMMARY

Embodiments of this application provide a policy control function network element selection method, an apparatus, a system, and a storage medium, to resolve a signaling waste problem that occurs each time a terminal device initiates a registration procedure in an existing PCF selection method.

A first aspect of this application provides a policy control function network element selection method. The method includes the following.

A first access and mobility management function network element receives a registration request message of a terminal device, where the registration request message includes an identifier of the terminal device, and where the first access and mobility management function network element is an access and mobility management function network element that is determined by an access network and that is configured to serve the terminal device.

The first access and mobility management function network element obtains, based on the identifier of the terminal device, an identifier of a policy control function network element currently serving the terminal device and a network identifier of the policy control function network element.

When a network identifier of the first access and mobility management function network element is consistent with the network identifier of the policy control function network element, the first access and mobility management function network element determines that the policy control function network element is a target policy control function network element.

In this embodiment, when the terminal device initiates registration, the first access and mobility management function network element may determine the policy control function network element used by the terminal device, and reuse the policy control function network element. This avoids an interaction procedure in which the policy control function network element is reselected through a network repository function network element, and the policy control function network element re-obtains, from a unified database, information such as a policy section identifier of the terminal device and policy content corresponding to the policy section identifier. In this way, signaling overheads are reduced.

In a possible implementation of the first aspect, the registration request message further includes the identifier of the policy control function network element and the network identifier of the policy control function network element. Additionally, that the first access and mobility management function network element obtains, based on the identifier of the terminal device, an identifier of a policy control function network element currently serving the terminal device and a network identifier of the policy control function network element includes the following.

The first access and mobility management function network element obtains the identifier of the policy control function network element and the network identifier of the policy control function network element from the registration request message of the terminal device based on the identifier of the terminal device.

In this embodiment, the terminal device may carry the identifier of the policy control function network element and the network identifier of the policy control function network element during initial registration. As such, the first access and mobility management function network element may reuse, based on the identifier of the policy control function network element and the network identifier of the policy control function network element that are carried during the initial registration of the terminal device, the policy control function network element used by the terminal device before deregistration. In this way, the first access and mobility management function network element on a network side does not need to reselect a policy control function network element for the terminal device performing initial registration, and does not need to re-obtain policy information from the unified database, either. This reduces signaling exchange and reduces resource consumption.

In another possible implementation of the first aspect, that the first access and mobility management function network element obtains, based on the identifier of the terminal device, an identifier of a policy control function network element currently serving the terminal device and a network identifier of the policy control function network element includes the following.

The first access and mobility management function network element obtains the identifier of the policy control function network element and the network identifier of the policy control function network element from a unified data management network element based on the identifier of the terminal device.

In this embodiment, the identifier of the PCF corresponding to the terminal device and the network identifier of the PCF are stored in the unified data management network element. During initial registration of the terminal device, the first access and mobility management function network element may reuse, based on the identifier of the policy control function network element and the network identifier of the policy control function network element that are obtained from the unified data management network element, the policy control function network element used for the terminal device before deregistration. In this way, a network side does not need to reselect a policy control function network element for the terminal device performing initial registration, and does not need to re-obtain policy information from the unified database, either. This reduces signaling exchange.

In still another possible implementation of the first aspect, that the first access and mobility management function network element obtains, based on the identifier of the terminal device, an identifier of a policy control function network element currently serving the terminal device and a network identifier of the policy control function network element includes the following.

The first access and mobility management function network element obtains the identifier of the policy control function network element and the network identifier of the policy control function network element from a second access and mobility management function network element based on the identifier of the terminal device, where the second access and mobility management function network element is an access and mobility management function network element that is configured to serve the terminal device before the terminal device requests to access the access network.

In this embodiment, the identifier of the policy control function network element corresponding to the terminal device and the network identifier of the policy control function network element are stored in the second access and mobility management function network element (an old access and mobility management function network element). During initial registration of the terminal device, the first access and mobility management function network element may reuse, based on the identifier of the policy control function network element and the network identifier of the policy control function network element that are obtained from the second access and mobility management function network element, the policy control function network element used by the terminal device before deregistration. In this way, a network side does not need to reselect a policy control function network element for the terminal device performing initial registration, and does not need to re-obtain policy information from the unified database, either. This reduces signaling overheads.

In another embodiment of this application, that a first access and mobility management function network element receives a registration request message of a terminal device includes the following.

The first access and mobility management function network element receives the registration request message sent by the terminal device through the access network.

A second aspect of this application provides a policy control function network element selection method. The method includes the following.

A second access and mobility management function network element performs a deregistration procedure with a terminal device, where the second access and mobility management function network element is an access and mobility management function network element that is configured to serve the terminal device before the terminal device requests to access an access network.

The second access and mobility management function network element removes an association relationship with a policy control function network element, where the policy control function network element is a policy control function network element currently serving the terminal device, and the policy control function network element retains policy information of the terminal device.

In this embodiment, the second access and mobility management function network element performs the deregistration procedure with the terminal device, and removes the association relationship with the policy control function network element. This provides an implementation possibility for subsequent re-registration of the terminal device.

In a possible implementation of the second aspect, before that the second access and mobility management function network element removes an association relationship with a policy control function network element, the method further includes the following.

The second access and mobility management function network element sends an identifier of the policy control function network element and a network identifier of the policy control function network element to the terminal device.

In this embodiment, when the second access and mobility management function network element deregisters with the terminal device, the second access and mobility management function network element directly sends the identifier of the policy control function network element and the network identifier of the policy control function network element to the terminal device. In this way, the terminal device may send a registration request message including the identifier of the policy control function network element and the network identifier of the policy control function network element to a first access and mobility management function network element. This avoids a process of determining the policy control function network element through signaling exchange, reduces signaling overheads, and avoids a waste of resources.

In another possible implementation of the second aspect, before that the second access and mobility management function network element removes an association relationship with a policy control function network element, the method further includes the following.

The second access and mobility management function network element sends an identifier of the policy control function network element and a network identifier of the policy control function network element to a unified data management network element.

In this possible implementation of the second aspect, the method further includes the following.

When the second access and mobility management function network element determines that the policy control function network element serving the terminal device changes, the second access and mobility management function network element updates the identifier of the policy control function network element and the network identifier of the policy control function network element that are stored in the unified data management network element.

In this embodiment, the second access and mobility management function network element timely updates the identifier of the policy control function network element and the network identifier of the policy control function network element that are stored in the unified data management network element. As such, correctness of the identifier of the policy control function network element and the network identifier of the policy control function network element that are stored in the unified data management network element can be ensured. This avoids incorrect storage of information, and improves system stability.

In still another possible implementation of the second aspect, before that the second access and mobility management function network element removes an association relationship with a policy control function network element, the method further includes the following.

The second access and mobility management function network element retains an identifier of the policy control function network element and a network identifier of the policy control function network element.

In this embodiment, when the second access and mobility management function network element deregisters with the terminal device, the identifier of the policy control function network element and the network identifier of the policy control function network element are retained. In this way, a first access and mobility management function network element may directly obtain the identifier of the policy control function network element and the network identifier of the policy control function network element from the second access and mobility management function network element. This avoids a redetermination process, reduces implementation complexity, and improves performance.

A third aspect of this application provides a policy control function network element selection method. The method includes the following.

A terminal device receives an identifier of a policy control function network element and a network identifier of the policy control function network element that are sent by a second access and mobility management function network element, where the policy control function network element is a policy control function network element currently serving the terminal device, and the second access and mobility management function network element is an access and mobility management function network element that is configured to serve the terminal device before the terminal device requests to access an access network.

The terminal device sends a registration request message to a first access and mobility management function network element through the access network, where the registration request message includes the identifier of the policy control function network element and the network identifier of the policy control function network element, and the first access and mobility management function network element is an access and mobility management function network element that is determined by the access network and that is configured to serve the terminal device.

The registration request message is used to indicate that the first access and mobility management function network element determines a target policy control function network element based on a network identifier of the first access and mobility management function network element and the network identifier of the policy control function network element.

In this embodiment, when receiving the identifier of the policy control function network element and the network identifier of the policy control function network element that are sent by the second access and mobility management function network element, the terminal device sends the registration request message including the identifier of the policy control function network element and the network identifier of the policy control function network element to the first access and mobility management function network element. In this way, the first access and mobility management function network element can obtain the identifier of the policy control function network element and the network identifier of the policy control function network element by parsing the registration request message. This reduces signaling overheads and avoids a waste of resources.

A fourth aspect of this application provides a policy control function network element selection apparatus. The apparatus includes a receiving module, an obtaining module, and a processing module, where the receiving module is configured to receive a registration request message of a terminal device, where the registration request message includes an identifier of the terminal device; the obtaining module is configured to obtain, based on the identifier of the terminal device, an identifier of a policy control function network element currently serving the terminal device and a network identifier of the policy control function network element; and the processing module is configured to: when a network identifier of a first access and mobility management function network element is consistent with the network identifier of the policy control function network element, determine that the policy control function network element is a target policy control function network element, where the first access and mobility management function network element is an access and mobility management function network element that is determined by an access network and that is configured to serve the terminal device.

In a possible implementation of the fourth aspect, the registration request message further includes the identifier of the policy control function network element and the network identifier of the policy control function network element; and the obtaining module is configured to obtain the identifier of the policy control function network element and the network identifier of the policy control function network element from the registration request message of the terminal device based on the identifier of the terminal device.

In another possible implementation of the fourth aspect, the obtaining module is configured to obtain the identifier of the policy control function network element and the network identifier of the policy control function network element from a unified data management network element based on the identifier of the terminal device.

In still another possible implementation of the fourth aspect, the obtaining module is configured to obtain the identifier of the policy control function network element and the network identifier of the policy control function network element from a second access and mobility management function network element based on the identifier of the terminal device, where the second access and mobility management function network element is an access and mobility management function network element that is configured to serve the terminal device before the terminal device requests to access the access network.

In yet another possible implementation of the fourth aspect, the receiving module is configured to receive the registration request message sent by the terminal device through the access network.

A fifth aspect of this application provides a policy control function network element selection apparatus. The apparatus includes a processing module, where the processing module is configured to: perform a deregistration procedure between a second access and mobility management function network element and a terminal device, where the second access and mobility management function network element is an access and mobility management function network element that is configured to serve the terminal device before the terminal device requests to access an access network; and remove an association relationship with a policy control function network element, where the policy control function network element is a policy control function network element currently serving the terminal device, and the policy control function network element retains policy information of the terminal device.

In a possible implementation of the fifth aspect, the apparatus further includes a sending module, where the sending module is configured to: before the processing module removes the association relationship with the policy control function network element, send an identifier of the policy control function network element and a network identifier of the policy control function network element to the terminal device.

In another possible implementation of the fifth aspect, the apparatus further includes a sending module, where the sending module is configured to: before the processing module removes the association relationship with the policy control function network element, send an identifier of the policy control function network element and a network identifier of the policy control function network element to a unified data management network element.

Optionally, the processing module is further configured to: when the second access and mobility management function network element determines that the policy control function network element serving the terminal device changes, update the identifier of the policy control function network element and the network identifier of the policy control function network element that are stored in the unified data management network element.

In still another possible implementation of the fifth aspect, the apparatus further includes a storage module, where the storage module is further configured to retain an identifier of the policy control function network element and a network identifier of the policy control function network element.

A sixth aspect of this application provides a communication apparatus. The apparatus includes a receiving module, a processing module, and a sending module, where the receiving module is configured to receive an identifier of a policy control function network element and a network identifier of the policy control function network element that are sent by a second access and mobility management function network element, where the policy control function network element is a policy control function network element currently serving a terminal device, and the second access and mobility management function network element is an access and mobility management function network element that is configured to serve the terminal device before the terminal device requests to access an access network; and the processing module is configured to send a registration request message to a first access and mobility management function network element using the sending module through the access network, where the registration request message includes the identifier of the policy control function network element and the network identifier of the policy control function network element, and the first access and mobility management function network element is an access and mobility management function network element that is determined by the access network and that is configured to serve the terminal device.

The registration request message is used to indicate that the first access and mobility management function network element determines a target policy control function network element based on a network identifier of the first access and mobility management function network element and the network identifier of the policy control function network element.

A seventh aspect of this application provides a policy control function network element selection apparatus. The apparatus includes a processor, a memory, and a computer program that is stored in the memory and that can be run on the processor. When executing the program, the processor implements the method according to any one of the first aspect and the possible implementations of the first aspect.

An eighth aspect of this application provides a policy control function network element selection apparatus. The apparatus includes a processor, a memory, and a computer program that is stored in the memory and that can be run on the processor. When executing the program, the processor implements the method according to any one of the second aspect and the possible implementations of the second aspect.

A ninth aspect of this application provides a communication apparatus. The apparatus includes a processor, a memory, and a computer program that is stored in the memory and that can be run on the processor. When executing the program, the processor implements the method according to the third aspect.

A tenth aspect of this application provides a communication system. The communication system includes a first access and mobility management function network element and a second access and mobility management function network element, and optionally may further include a unified data management network element or a terminal device. The first access and mobility management function network element is an access and mobility management function network element that is determined by an access network and that is configured to serve the terminal device. The second access and mobility management function network element is an access and mobility management function network element that is configured to serve the terminal device before the terminal device requests to access the access network. The unified data management network element is configured to store an identifier of a policy control function network element serving the terminal device and a network identifier of the policy control function network element.

The first access and mobility management function network element is the apparatus according to any one of the fourth aspect and the possible implementations of the fourth aspect. The second access and mobility management function network element is the apparatus according to any one of the fifth aspect and the possible implementations of the fifth aspect. The terminal device is the apparatus according to the sixth aspect.

An eleventh aspect of this application provides a storage medium. The storage medium stores instructions; and when the instructions are run on a computer, the computer is enabled to perform the method according to any one of the first aspect and the possible implementations of the first aspect.

A twelfth aspect of this application provides a storage medium. The storage medium stores instructions; and when the instructions are run on a computer, the computer is enabled to perform the method according to any one of the second aspect and the possible implementations of the second aspect.

A thirteenth aspect of this application provides a storage medium. The storage medium stores instructions; and when the instructions are run on a computer, the computer is enabled to perform the method according to the third aspect.

A fourteenth aspect of this application provides a program product including instructions. When the program product runs on a computer, the computer is enabled to perform the method according to any one of the first aspect and the possible implementations of the first aspect.

A fifteenth aspect of this application provides a program product including instructions. When the program product runs on a computer, the computer is enabled to perform the method according to any one of the second aspect and the possible implementations of the second aspect.

A sixteenth aspect of this application provides a program product including instructions. When the program product runs on a computer, the computer is enabled to perform the method according to the third aspect.

A seventeenth aspect of this application provides a chip for running instructions. The chip is configured to perform the method according to any one of the first aspect and the possible implementations of the first aspect.

An eighteenth aspect of this application provides a chip for running instructions. The chip is configured to perform the method according to any one of the second aspect and the possible implementations of the second aspect.

A nineteenth aspect of this application provides a chip for running instructions. The chip is configured to perform the method according to the third aspect.

According to the policy control function network element selection method, the apparatus, the system, and the storage medium provided in the embodiments of this application, the first AMF receives the registration request message of the terminal device, and the registration request message includes the identifier of the terminal device. The first AMF is the AMF that is determined by the access network and that is configured to serve the terminal device; obtains, based on the identifier of the terminal device, the identifier of the PCF currently serving the terminal device and the network identifier of the PCF; and when the network identifier of the first AMF is consistent with the network identifier of the PCF, determines that the PCF is the target PCF. In this technical solution, in the selection policy of the first AMF, the terminal device reuses the PCF and the policy information of the terminal device that are previously used during initial registration. This avoids repeated access of the policy information of the terminal device, and resolves a signaling waste problem.

BRIEF DESCRIPTION OF DRAWINGS

FIG. 4A to FIG. 4C are an interaction flowchart of replacing an AMF by a user equipment (UE);

FIG. 7A to FIG. 7C are a schematic interaction diagram of Embodiment 3 of a PCF selection method according to an embodiment of this application;

DESCRIPTION OF EMBODIMENTS

Figure 1:
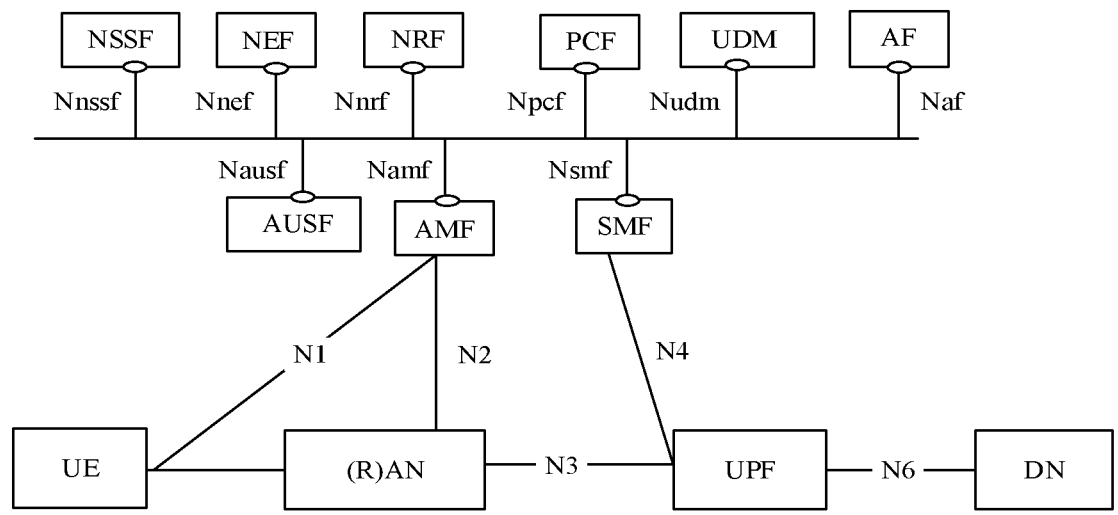
FIG. 1 is a schematic diagram of an application scenario of a PCF selection method according to an embodiment of this application.

In the following, some terms in embodiments of this application are described, to help a person skilled in the art have a better understanding.

UE: The user equipment (UE) is also referred to as a terminal device in the embodiments of this application, and may include various handheld devices, vehicle-mounted devices, wearable devices, or computing devices that have a wireless communication function, or other processing devices connected to a wireless modem, such as a smartphone, an IoT chip, and a vehicle in a V2X network.

(R)AN: The (radio) access network ((R)AN) is mainly used to control UE to access a mobile communication network through wireless access.

UPF: Main functions of the user plane function (UPF) network element include user user-plane related functions, for example, packet routing and transmission, packet detection, service usage reporting, quality of service (QOS) processing, lawful interception, uplink packet detection, and downlink packet storage.

AMF: Main functions of the access and mobility management function (AMF) network element include access and mobility-related functions, for example, connection management, mobility management, registration management, access authentication and authorization, reachability management, and security context management.

SMF: Main functions of the session management function (SMF) network element include session-related functions, for example, session management (for example, session establishment, modification, and release, including tunnel maintenance between the UPF network element and an access network (AN)), UPF network element selection and control, service and session continuity (SSC) mode selection, and roaming.

PCF: Main functions of the policy control function (PCF) network element include policy-related functions, for example, formulating a unified policy, providing policy control, and obtaining, from a unified data repository (UDR), subscription information related to a policy decision. The PCFs (which may include an H-PCF and a V-PCF), where H and V, that is, Home and Visited, represent a home domain and a roaming domain.

NSSF: Main functions of the network slice selection function (NSSF) network element include functions, for example, selecting a group of network slice instances for the UE, determining allowed NSSAI, and determining an AMF set that can serve the UE.

NRF: Main functions of the network repository function (NRF) network element include a service discovery function, and maintaining NF (NF) texts of available NF network element instances and services supported by the NF instances.

AF: The application function (AF) network element interacts with a 3rd Generation Partnership Project (3GPP) core network to provide a service or a service, including interacting with an NEF, interacting with a policy architecture, or the like.

NEF: Main functions of the network exposure function (NEF) network element include securely exposing a service and a capability that are provided by a 3GPP network function, including internally exposing the service and the capability, exposing the service and the capability to a third party, or the like, and converting or translating information exchanged with the AF and information exchanged with an internal network function, such as an AF service identifier and internal $5^{th}$ generation (5G) core network information such as a data network name (DNN) and single network slice selection assistance information (S-NSSAI).

UDM: The unified data management (UDM) network element supports processing of a credential for authentication, user identity processing, access authorization, registration and mobility management, subscription management, short message management, or the like in a 3GPP authentication and key agreement mechanism.

AUSF: The authentication server function (AUSF) network element interacts with the UDM to obtain user information, and performs authentication-related functions, for example, generating an intermediate key.

DN: Data network.

The policy control function network element selection method provided in the following embodiments of this application is applicable to a communication system. FIG. 1 is a schematic diagram of an application scenario of a PCF selection method according to an embodiment of this application. The application scenario is applicable to a service-based architecture (SBA), which is an important feature of a 5G mobile communication system. As shown in FIG. 1, the application scenario may include network elements such as a UE, a (R)AN, a UPF, a DN, an AMF, an SMF, an AUSF, an NSSF, an NEF, an NRF, a PCF, a UDM, and an AF. For example, in the application scenario shown in FIG. 1, the service-based architecture is described using a 5G non-roaming service-based architecture.

As shown in FIG. 1, in the non-roaming scenario, that is, when the UE is located in a home public land mobile network (HPLMN), the AMF only needs to select one PCF. For example, the UE may directly access the AMF, or may access the AMF through the (R)AN, to select an appropriate PCF by communicating with another network element.

For example, in this embodiment, there is a connection relationship between the (R)AN and the UPF, the UPF and the SMF may communicate with each other, and the UPF may access the DN. In the embodiment shown in FIG. 1, the AMF, the SMF, the AUSF, the NSSF, the NEF, the NRF, the PCF, the UDM, and the AF may all communicate with each other through a system bus. That is, in this embodiment of this application, based on a service-based architecture, slicing, CU separation, and the like, a 5G core network can implement, using a cloud-based technology, customized, open, and service-based networks and satisfy internet of everything requirements for supporting heavy traffic, massive connections, and a low latency.

Specific communication principles between network elements are not described herein again, and may be determined based on an actual requirement.

Figure 2:
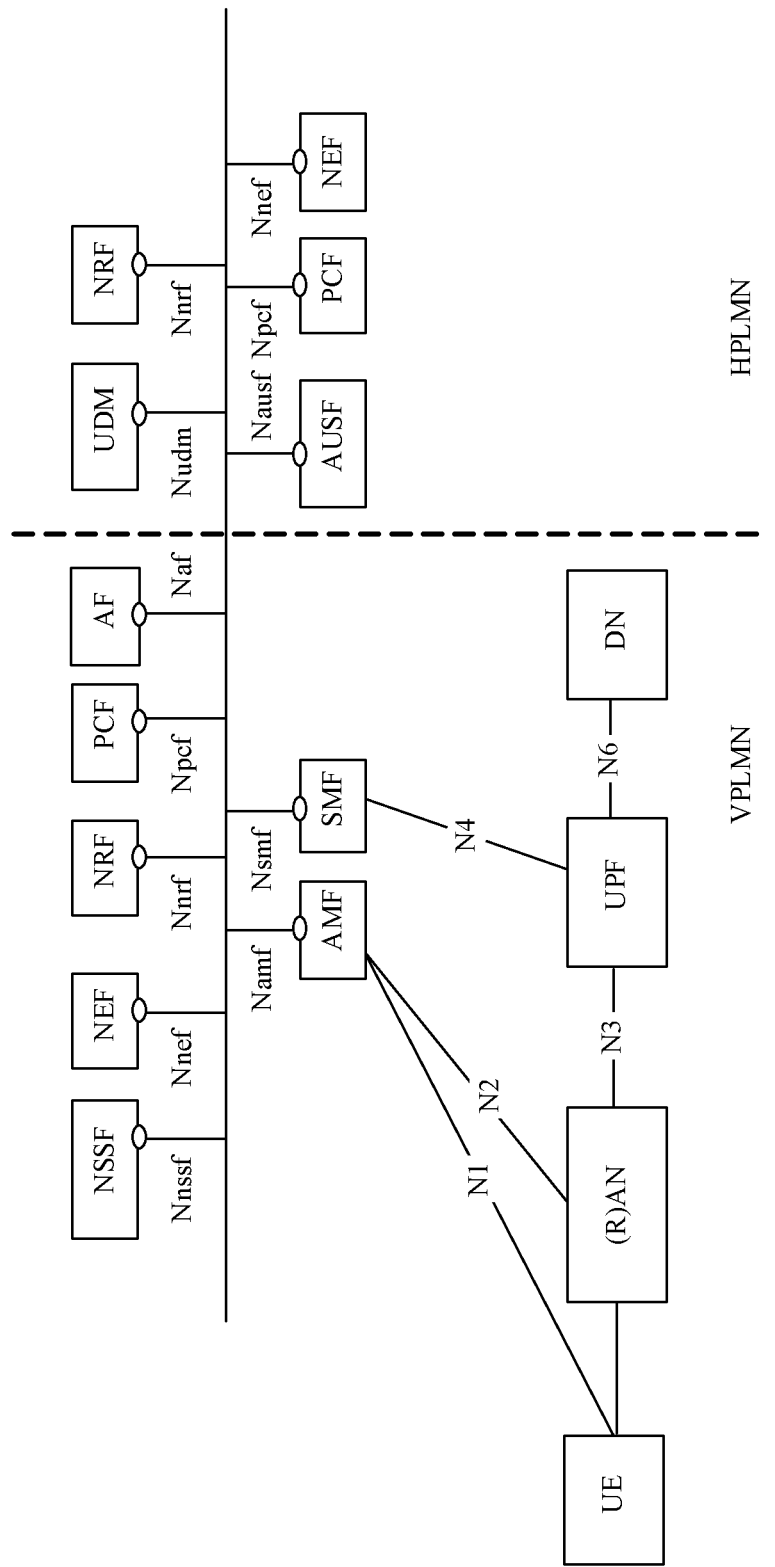
FIG. 2 is a schematic diagram of another application scenario of a PCF selection method according to an embodiment of this application.
Figure 3:
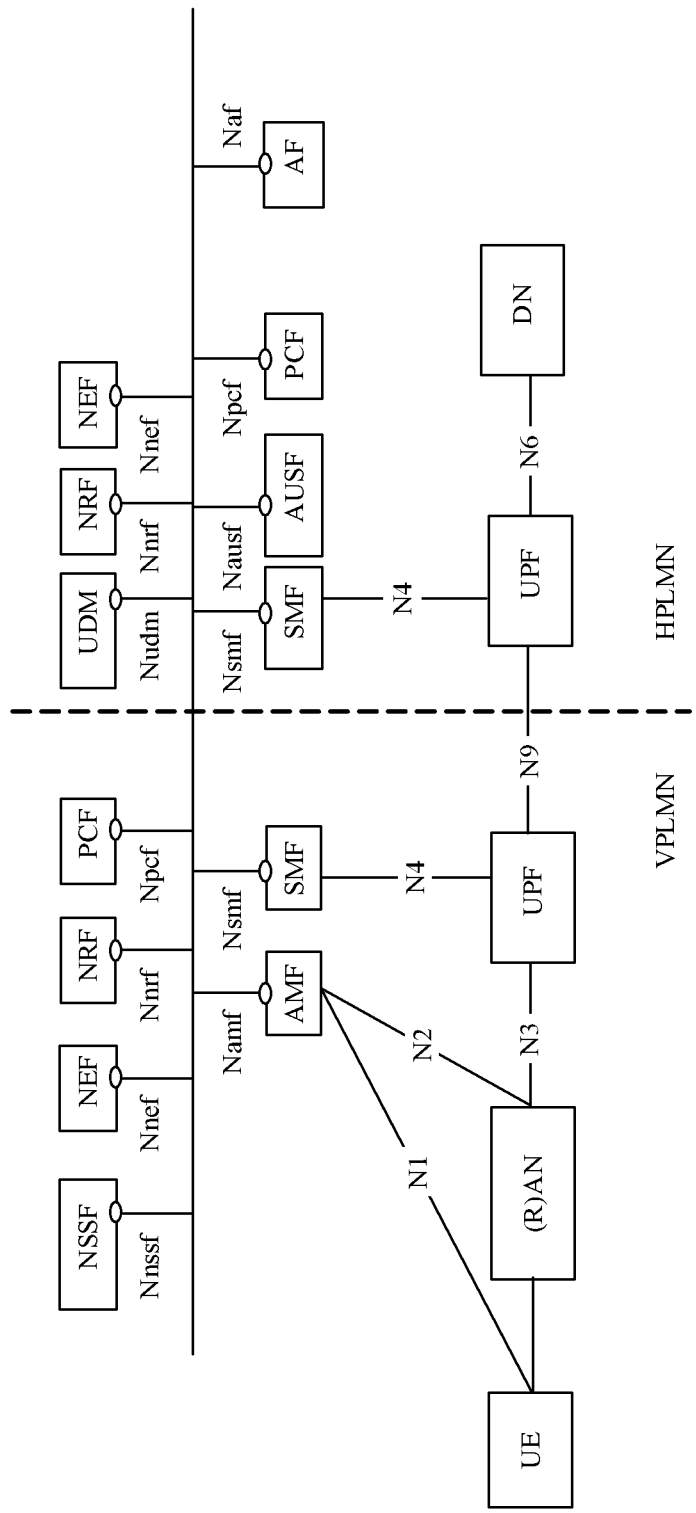
FIG. 3 is a schematic diagram of still another application scenario of a PCF selection method according to an embodiment of this application.

For example, FIG. 2 is a schematic diagram of another application scenario of a PCF selection method according to an embodiment of this application. FIG. 3 is a schematic diagram of still another application scenario of a PCF selection method according to an embodiment of this application. A difference between the application scenario shown in FIG. 2 and the application scenario shown in FIG. 1 lies in that the application scenario shown in FIG. 2 is applicable to a 5G local offloading roaming service-based architecture. A difference between the application scenario shown in FIG. 3 and the application scenario shown in FIG. 1 lies in that the application scenario shown in FIG. 3 is applicable to a 5G home routing roaming service-based architecture.

As shown in FIG. 2 and FIG. 3, both public land mobile networks (PLMNs) of service-based architectures in FIG. 2 and FIG. 3 include VPLMNs (e.g., roaming or visited PLMN networks) and HPLMNs (e.g., home PLMN networks). A difference between FIG. 2 and FIG. 3 lies in that, when the UE is located in the VPLMN, in the service-based architecture shown in FIG. 2, the UPF and the DN are located in the VPLMN; however, in the service-based architecture shown in FIG. 3, both the VPLMN and the HPLMN have UPFs, the UPFs in the VPLMN and the HPLMN can communicate with each other, and the DN is located in the HPLMN.

In the service-based architectures shown in FIG. 2 and FIG. 3, the AMF needs to select two PCFs: a V-PCF (namely, a PCF located in the VPLMN), and an H-PCF (namely, a PCF located in the HPLMN). For an implementation principle of the selection, details are not described herein again.

It may be understood that the network elements included in the application scenarios shown in FIG. 1 and FIG. 2 are merely schematic diagrams. Actually, the foregoing application scenarios may further include another device, for example, a wireless relay device and a wireless backhaul device, or another network entity such as a network controller. This is not limited in the embodiments of this application.

In the embodiments of this application, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following first briefly describes a scenario to which the embodiments of this application are applicable.

During actual application, when a region in which the UE is located changes, the AMF serving as a server of the UE needs to be updated. Therefore, the UE needs to clear subscription information and a mobility management (MM) context from an old AMF. Therefore, the AMF triggers a procedure of clearing subscription information from the AMF, namely, a "purge of subscriber data in AMF" procedure.

For example, the AMF first sends a subscription information cancellation request (for example, an Nudm_SDM_Unsubscribe request) to the UDM, and after processing the subscription information cancellation request, the UDM sends a subscription information cancellation response (namely, an Nudm_SDM_Unsubscribe response); similarly, the AMF first sends a deregistration request (for example, an Nudm_UECM_Deregistration request) to the UDM, and after processing the deregistration request, the UDM sends a deregistration response (for example, an Nudm_UECM_Deregistration response), such that the AMF cancels a subscription event in the UDM and cancels registration with the UDM.

The following describes a registration procedure initiated by UE to an AMF when the UE accesses a 5G network.

For example, when accessing the 5G network (where for the network architecture, refer to FIG. 1), the UE initiates the registration procedure to the AMF. When a dynamic policy is deployed in the network, the AMF performs a PCF selection procedure, obtains a serving PCF, and initiates a policy obtaining procedure to the serving PCF.

The procedure in which the AMF selects the PCF includes: First, the AMF interacts with an NRF to obtain a PCF instance (for details about the interaction procedure between the AMF and the NRF, refer to the following PCF selection solutions), and selects the PCF to be used from the PCF instance; second, the AMF selects the PCF according to a local configuration policy.

In an example, in the non-roaming application scenario shown in FIG. 1, that is, when the UE is located in an HPLMN (home PLMN or home PLMN network) network, the AMF only needs to select one PCF.

In another example, in the non-roaming application scenario shown in FIG. 2 or FIG. 3, that is, when the UE is located in a VPLMN (visited or visited PLMN network) network, the AMF needs to select two PCFs: a V-PCF (namely, a PCF located in the VPLMN) and an H-PCF (namely, a PCF located in the HPLMN).

Figure 4A:
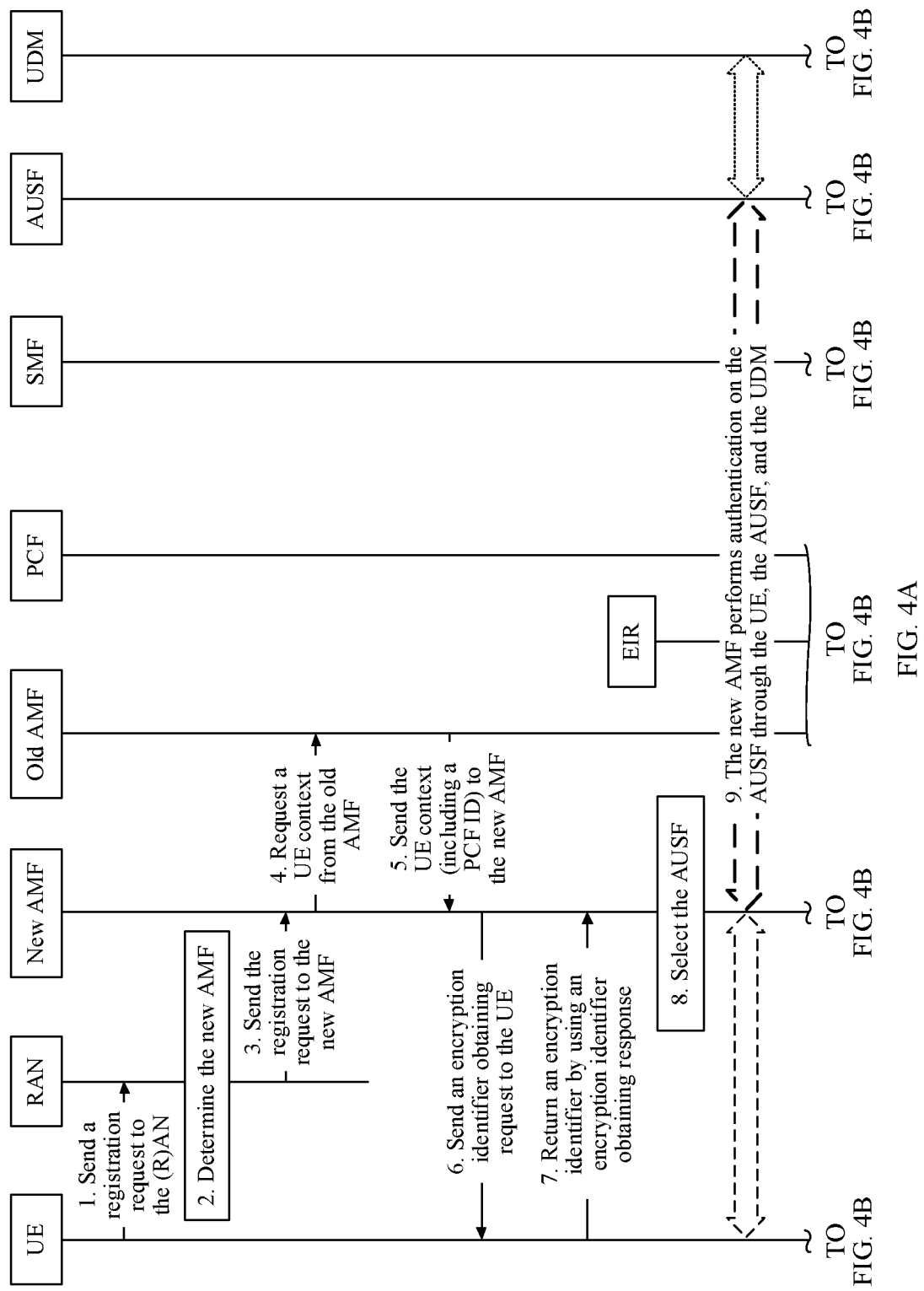
Figure 4B:
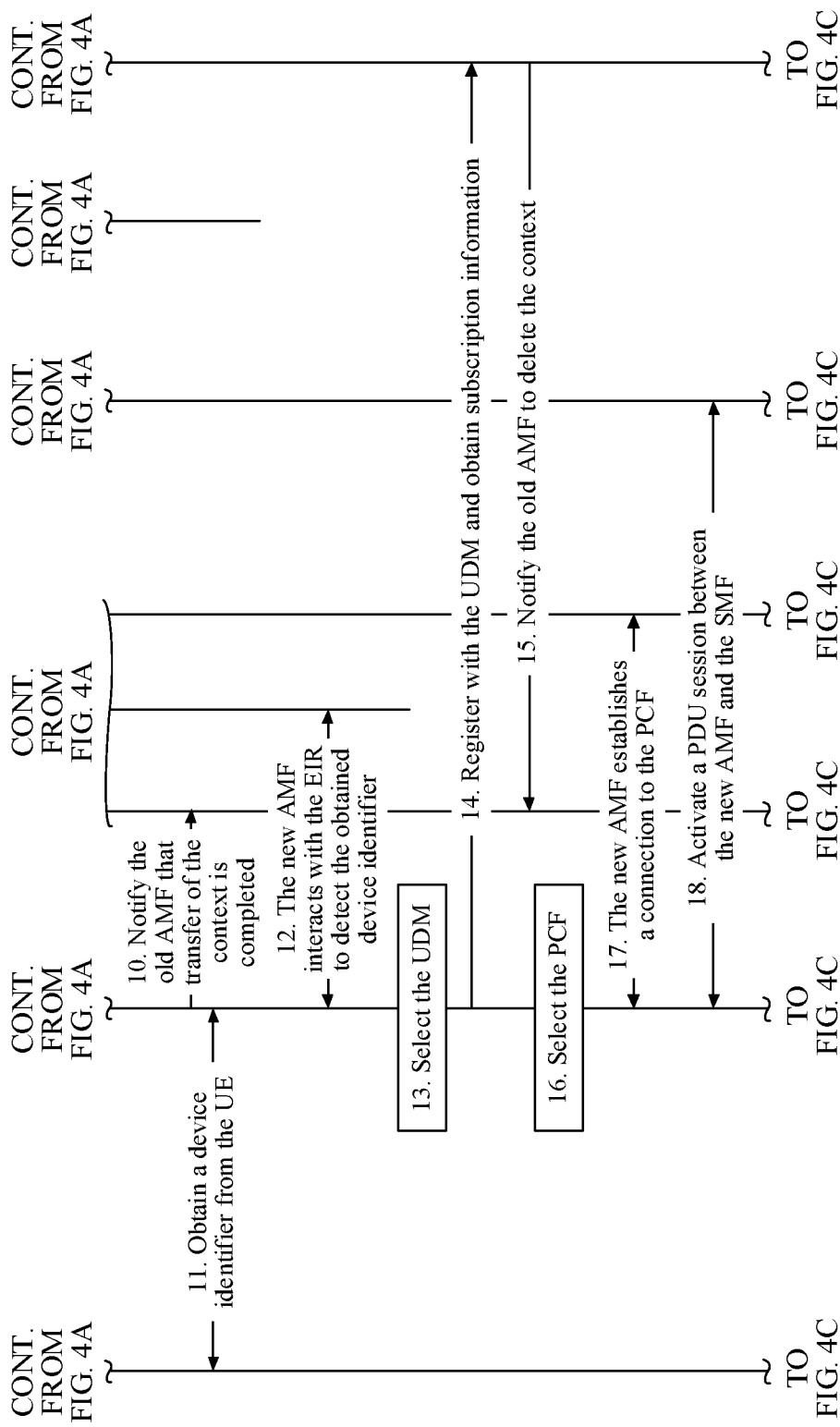

For example, FIG. 4A to FIG. 4C are an interaction flowchart of replacing an AMF by UE. In this embodiment, network elements participating in processing include UE, a (R)AN, a new AMF, an old AMF, a PCF, an SMF, an AUSF, UDM, an equipment identity register (EIR), a non-3GPP interworking function (N3IWF), and the like. As shown in FIG. 4A to FIG. 4C, steps of replacing the AMF by the UE are as follows.

1. The UE sends a registration request to the (R)AN.
2. The (R)AN determines the new AMF.
3. The (R)AN sends the registration request to the new AMF.

For example, if the AMF changes due to a reason such as movement of the UE, perform 4. The new AMF requests a UE context (an MM context) from the old AMF.
5. The old AMF sends the UE context to the new AMF, and the UE context includes a PCF ID.
6. The new AMF sends an encryption identifier obtaining request to the UE.
7. The UE returns an encryption identifier using an encryption identifier obtaining response.
8. The new AMF selects the AUSF.
9. The new AMF performs authentication on the AUSF through the UE, the AUSF, and the UDM.

When the authentication succeeds, perform 10. The new AMF notifies the old AMF that transfer of the context is completed.

11. The new AMF obtains a device identifier from the UE.
12. The new AMF interacts with the EIR to detect the obtained device identifier.
13. The new AMF selects the UDM.
14. The new AMF registers with the UDM and obtains subscription information.
15. The UDM notifies the old AMF to delete the context.
16. The new AMF selects the PCF (for details, refer to descriptions of selection of the PCF below).
17. The new AMF establishes a connection to the PCF. If a (V-) PCF ID received by the PCF is consistent with a PCF ID of the PCF, the PCF deletes a connection to the old AMF (that is, the PCF initiates the deletion procedure), but retains the UE context.
18. Activate a PDU session between the new AMF and the SMF.
19. The new AMF interacts with the N3IWF on a non-3GPP side.

In an example, if the UE context does not carry the PCF ID, perform 20. The old AMF deletes a connection to an original PCF (that is, the old AMF initiates the deletion procedure).

21. The new AMF sends a registration acceptance notification to the UE.
22. The UE completes registration.

On the basis of the foregoing embodiment, a procedure in which the AMF interacts with the NRF to obtain PCF information and selects the PCF is as follows.

In an embodiment, when the UE is located in the HPLMN, the AMF is located in the HPLMN, the AMF sends an NF discovery request to the NRF in the HPLMN, to obtain the PCF information (for example, an Internet Protocol (IP) address of the PCF (which may be an IPV4 address or an IPV6 prefix) or a fully qualified domain name (FQDN)) in the HPLMN, and the AMF selects the PCF based on the obtained PCF information.

In another embodiment, when the UE is located in the VPLMN, the AMF is also located in the VPLMN. In this scenario, the AMF needs to select two PCFs, namely, the V-PCF and the H-PCF. The AMF sends an NF discovery request to a V-NRF, obtains V-PCF information in the VPLMN, and selects the V-PCF based on the V-PCF information. Further, the AMF sends an NF discovery request to an H-NRF through the V-NRF, obtains H-PCF information in the HPLMN, and selects the H-PCF based on the PCF information.

It should be noted that, an implementation principle in which the AMF obtains the PCF may be selected according to an actual situation. Details are not described herein again.

For example, the following describes an association establishment process of an access and mobility management (AM) policy. For example, when the UE initiates initial registration or the AMF changes, an AM policy association procedure between the AMF and the PCF is triggered.

It should be noted that a UE policy association may further be performed between the AMF and the PCF. A related procedure of the UE policy association is similar to a related procedure of the AM policy association. In a non-roaming scenario, the AMF in the AM policy association is directly replaced with the UE. In a roaming scenario, the UE policy association is associated with the V-PCF and H-PCF, and the AM policy association is associated with the V-PCF.

In this embodiment, the PCF selected by the AMF may be a PCF determined using the UE policy association, or may be a PCF determined using the AM policy association. This is not limited in this embodiment of this application.

In an example, when the UE initiates initial registration, a process in which the AMF selects a new PCF and establishes an association relationship is as follows.
1. The AMF determines to establish an AM policy association.
2. The AMF sends an AM policy establishment request to the PCF.
3. The PCF returns an AM policy establishment response to the AMF.
4. The AMF deploys an AM policy based on the received AM policy response.

In another example, when the AMF changes, the new AMF reselects a PCF and establishes an association relationship. A procedure is as follows.
1. The new AMF receives the UE context from the old AMF. The context contains the PCF ID selected by the old AMF.
2. The new AMF determines to establish an AM policy association.
3. The new AMF sends an AM policy establishment request to the PCF.
4. The PCF returns an AM policy establishment response to the AMF.
5. The AMF deploys an AM policy based on the received AM policy response.

For example, the following describes an association termination process of the AM policy. In an example, the UE deregisters, to be more specific, when the AMF changes (and the old AMF does not send the PCF ID), the old AMF initiates association termination. In another example, when the AM policy association relationship is established or the policy information in the UDR changes, the PCF initiates association termination.

For example, a process in which the AMF initiates association termination is as follows:
1. The AMF determines to terminate the policy association.
2. The AMF carries a UE identifier and sends an AM policy association deletion request to the PCF.
3. After deleting the AM policy association, the PCF sends an AM policy association deletion response to the AMF.
4. The AMF deletes a stored AM policy context.

For example, a process in which the PCF initiates association termination is as follows.
1. The UDR deletes stored AM policy data.
2. The UDR notifies the PCF that the AM policy data is deleted.
3. If the PCF receives the PCF ID of the PCF, the PCF retains the UE context (policy context). If the PCF does not receive the PCF ID of the PCF, the PCF deletes the AM policy data and the UE context.
6. The AMF deletes the AM policy.

In a conventional technology, when the UE deregisters, the AMF triggers AM policy association termination. In this case, the AMF deletes the stored PCF ID, and the PCF deletes information such as a policy section identifier (policy section identifier, PSI) maintained internally.

For example, a UE-initiated deregistration procedure is as follows:
1. The UE sends a deregistration request to the AMF.
2. The AMF sends a PDU session release request to the SMF, and the SMF releases a PDU session and responds to the AMF.
3. The SMF initiates session management policy association termination to the PCF, and terminates the session management policy association.
4. The SMF cancels event subscription in the UDM and cancels registration with the UDM.
5. The AMF interacts with the PCF to terminate the AM policy association.
6. The AMF sends a deregistration acceptance message to the UE.
7. The AMF sends a signaling connection release request to the AMF through the (R)AN.

For example, a network-initiated deregistration procedure is as follows.
1. The AMF receives a deregistration notification sent by the UDM.
2. The AMF sends a deregistration request to the UE, and the AMF simultaneously sends a notification response to the UDM, to cancel event subscription in the UDM.
3. The AMF sends a PDU session release request to the SMF, and the SMF releases a PDU session and responds to the AMF.
4. The SMF initiates session management policy association termination to the PCF, and terminates the session management policy association.
5. The SMF cancels event subscription in the UDM and cancels registration with the UDM.
6. The AMF interacts with the PCF to terminate the AM policy association.
6. The AMF receives a deregistration acceptance message sent by the UE.
7. The AMF sends a signaling connection release request to the AMF through the (R)AN.

According to the preceding analysis, during initial registration of the UE, the AMF needs to reselect the PCF through the NRF, and the PCF needs to obtain the information such as the PSI of the UE and policy content corresponding to the PSI from the UDR. However, the policy content of the UE that is stored in the UDR does not change due to deregistration of the UE. Consequently, repeated access causes a waste of signaling.

For the foregoing problem, the embodiments of this application provide a policy control function network element selection method. A first AMF receives a registration request message of a terminal device, and the registration request message includes an identifier of the terminal device. The first AMF is an AMF that is determined by an access network and that is configured to serve the terminal device; obtains, based on the identifier of the terminal device, an identifier of a PCF currently serving the terminal device and a network identifier of the PCF; and when a network identifier of the first AMF is consistent with the network identifier of the PCF, determines that the PCF is a target PCF. That is, in this technical solution, in the selection policy of the first AMF, the terminal device reuses the PCF and policy information of the terminal device that are previously used during initial registration. This avoids repeated access of the policy information of the terminal device, and resolves a signaling waste problem.

The following describes the technical solutions of this application in detail with reference to example embodiments. It should be noted that any of the embodiments disclosed herein may be combined with each other, and for brevity, a same or similar concept or process may not be described repeatedly in some embodiments.

Figure 5:
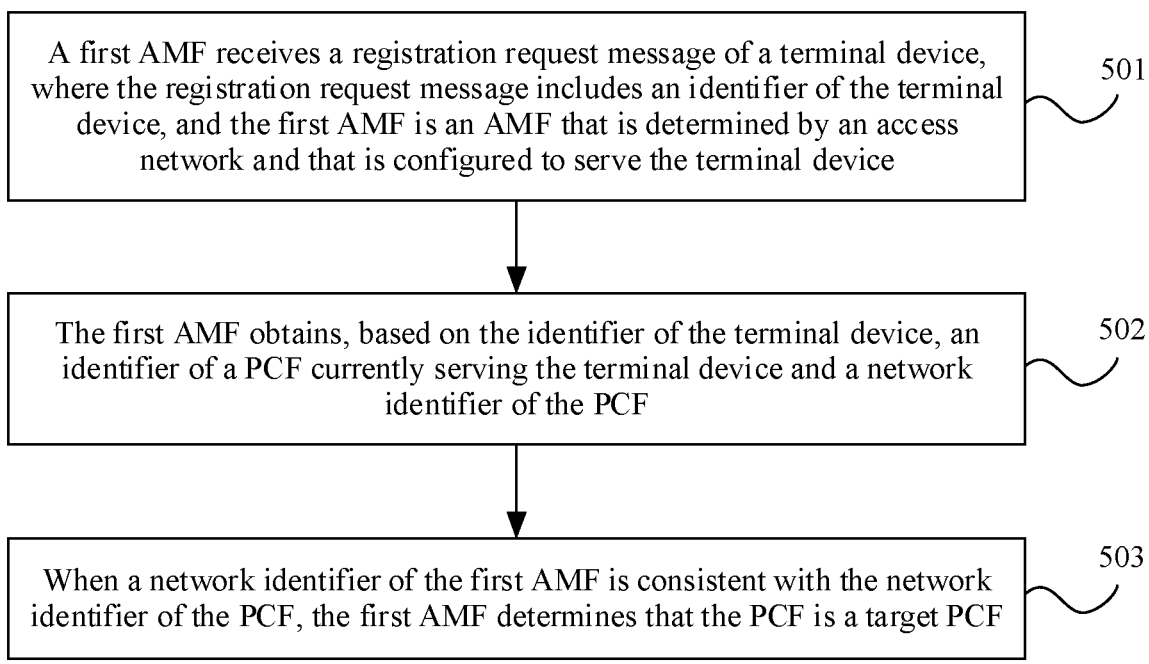
FIG. 5 is a schematic flowchart of Embodiment 1 of a PCF selection method according to an embodiment of this application.

FIG. 5 is a schematic flowchart of Embodiment 1 of a PCF selection method according to an embodiment of this application. As shown in FIG. 5, in this embodiment, the method may include the following steps.

Step 501: A first AMF receives a registration request message of a terminal device, where the registration request message includes an identifier of the terminal device, and the first AMF is an AMF that is determined by an access network and that is configured to serve the terminal device.

In this embodiment of this application, when the terminal device determines, due to a reason such as movement or initial registration, that the AMF configured to serve the terminal device needs to change, the terminal device re-initiates a registration request message to the access network, to request to access the access network. To enable the access network to determine the terminal device that sends the registration request message, the registration request message may include the identifier of the terminal device. Therefore, the access network may determine, based on the received registration request message, the first AMF configured to serve the terminal device, and send the received registration request message to the first AMF, such that the first AMF determines, based on the identifier of the terminal device in the received registration request message, a PCF corresponding to the terminal device.

It can be learned from analysis of this step that step 501 is actually: The first AMF receives the registration request message sent by the terminal device through the access network.

Step 502: The first AMF obtains, based on the identifier of the terminal device, an identifier of a PCF currently serving the terminal device and a network identifier of the PCF.

In this embodiment, when the first AMF receives the registration request message of the terminal device that is forwarded by the access network, the first AMF may first determine the corresponding terminal device based on the identifier of the terminal device, and then determine, based on a deregistration procedure initiated by the terminal device or a network device, the identifier of the PCF currently serving the terminal device and a location of the network identifier of the PCF, to determine how to obtain the identifier of the PCF and the network identifier of the PCF.

It should be noted that, in the following embodiments, without special descriptions, if the terminal device is in a roaming state, quantities of identifiers of PCFs currently serving the terminal device and network identifiers of the PCFs that are obtained by the first AMF are both two. One is an identifier of a V-PCF, and a network identifier of the V-PCF is a VPLMN; the other is an identifier of an H-PCF, and the network identifier of the H-PCF is an HPLMN. That is, the V-PCF is located in the VPLMN, and the H-PCF is located in the HPLMN.

In an example, the registration request message further includes the identifier of the PCF currently serving the terminal device and the network identifier of the PCF. In other words, when the terminal device stores the identifier of the PCF serving the terminal device and the network identifier of the PCF, the terminal device sends the registration request message including the identifier of the PCF, the network identifier of the PCF, and the identifier of the terminal device to the access network when initiating a registration procedure. Correspondingly, the access network then sends the registration request message to the determined first AMF. In this case, the first AMF may obtain, from the received registration request message, the identifier of the PCF currently serving the terminal device and the network identifier of the PCF.

In another example, if the identifier of the PCF currently serving the terminal device and the network identifier of the PCF are sent to a UDM during deregistration, when performing registration with the UDM and obtaining subscription information, the first AMF may obtain the identifier of the PCF currently serving the terminal device and the network identifier of the PCF from the UDM.

In still another example, if the terminal device deregisters with a second AMF configured to serve the terminal device before the terminal device accesses the access network, if the second AMF does not delete the identifier of the PCF and the network identifier of the PCF that are stored, when receiving the registration request message of the terminal device, the first AMF may obtain the identifier of the PCF currently serving the terminal device and the network identifier of the PCF from the second AMF.

For an implementation of each example, refer to descriptions in the following embodiments. Details are not described herein again.

Step 503: When a network identifier of the first AMF is consistent with the network identifier of the PCF, the first AMF determines that the PCF is a target PCF.

In this embodiment, the first AMF may compare the network identifier of the first AMF with the obtained network identifier of the PCF. If the two identifiers are consistent, the first AMF may directly determine the PCF as the target PCF. In other words, during initial registration of UE, the first AMF may directly reuse a previous PCF, and does not need to reselect a PCF through an NRF.

It may be understood that the network identifier of the first AMF is also an identifier of a network currently accessed by the UE. Therefore, when the identifier of the network currently accessed by the UE is consistent with the network identifier of the PCF, the first AMF may also determine that the PCF is the target PCF. That is, in this embodiment, the registration request message is used to indicate that the first AMF determines the target PCF based on the network identifier of the first AMF and the network identifier of the PCF.

According to the policy control function network element selection method provided in this embodiment of this application, the first AMF receives the registration request message of the terminal device, and the registration request message includes the identifier of the terminal device. The first AMF is the AMF that is determined by the access network and that is configured to serve the terminal device; obtains, based on the identifier of the terminal device, the identifier of the PCF currently serving the terminal device and the network identifier of the PCF; and when the network identifier of the first AMF is consistent with the network identifier of the PCF, determines that the PCF is the target PCF. In this technical solution, the terminal device directly reuses the previous PCF when initiating registration. This avoids an interaction procedure in which the PCF is reselected through the NRF and the PCF re-obtains, from a UDR, information such as a PSI of the terminal device and policy content corresponding to the PSI. In this way, signaling overheads are reduced.

Figure 6:
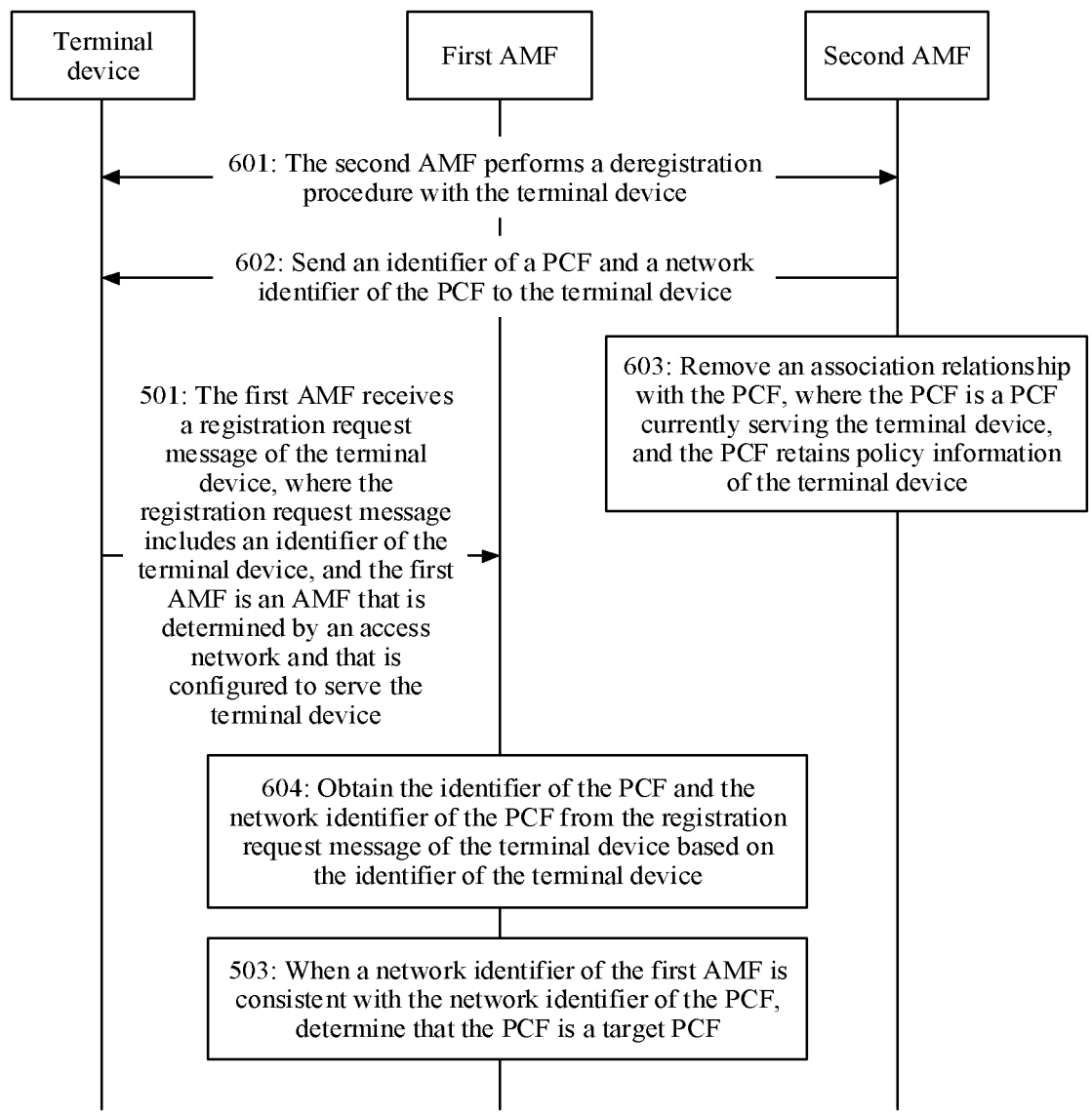
FIG. 6 is a schematic interaction diagram of Embodiment 2 of a PCF selection method according to an embodiment of this application.

For example, based on the foregoing embodiment, FIG. 6 is a schematic interaction diagram of Embodiment 2 of the PCF selection method according to an embodiment of this application. In this embodiment, information exchange between the terminal device, the second AMF configured to serve the terminal device before the terminal device accesses the access network, and the first AMF that is determined by the access network and that is configured to serve the terminal device is used for description. In this embodiment, as shown in FIG. 6, before step 501, the method may further include the following steps.

Step 601: The second AMF performs a deregistration procedure with the terminal device.

In this embodiment, when the terminal device determines, due to a reason such as movement or initial registration, that the AMF configured to serve the terminal device needs to change, the second AMF is an AMF configured to serve the terminal device before the change. Therefore, the deregistration procedure needs to be performed between the terminal device and the second AMF, such that an association relationship between the second AMF and the PCF is removed.

Step 602: The second AMF sends the identifier of the PCF and the network identifier of the PCF to the terminal device.

For example, in this embodiment, when the deregistration procedure is performed between the terminal device and the second AMF, the second AMF initiates an AM policy connection termination procedure, and the PCF may only disconnect from the second AMF, but retains policy information such as a PSI of the terminal device. In addition, the second AMF may deliver the PCF ID and the PLMN ID corresponding to the PCF that are stored to the terminal device.

In a possible design of this embodiment, step 602 may be implemented using the following procedure:

If the deregistration procedure is initiated by the terminal device, the second AMF sends the identifier of the PCF and the network identifier of the PCF to the terminal device using a deregistration acceptance message.

For example, if the deregistration procedure is initiated by the terminal device, the second AMF initiates a PDU session release request to an SMF, the SMF releases a PDU session and responds to the second AMF, and the SMF initiates session management policy association termination, cancels event subscription in the UDM, and cancels registration with the UDM. Further, the second AMF may initiate the AM policy association termination procedure, and send the deregistration acceptance message to the terminal device. Finally, the second AMF initiates release of a signaling connection between the second AMF and the terminal device.

The deregistration message includes the ID of the PCF currently serving the terminal device and the network identifiers of the PCF, for example, the PLMN ID.

It should be noted that, in a roaming scenario, the deregistration message may include identifiers of two PCFs. One (V-PCF) is located in a VPLMN and the other (H-PCF) is located in an HPLMN.

Therefore, in this embodiment of this application, the second AMF may include the identifier of the PCF and the network identifier of the PCF in the deregistration acceptance message sent to the terminal device. In this way, during initial registration, the terminal device may include the PCF ID and the PLMN ID of the PCF in the registration request message, and transfer the registration request message to the first AMF through the access network. In this way, the first AMF may determine whether a PLMN ID of a network in which the first AMF is located is consistent with the obtained PLMN ID of the PCF. When the PLMN IDs are consistent, the first AMF may preferentially reuse the PCF transferred by the terminal device, to avoid re-obtaining.

In another possible design of this embodiment, step 602 may be implemented using the following procedure.

If the deregistration procedure is initiated by the UDM (unified data management network element) on a network side, the second AMF sends, to the terminal device using a deregistration request message, the identifier of the PCF and the network identifier of the PCF that are obtained from the unified data management network element UDM.

If the deregistration is initiated on the network side, the identifier of the PCF and the network identifier of the PCF may be carried in the deregistration request message.

For example, in this embodiment, the second AMF may receive a deregistration notification sent by the UDM, and the deregistration notification may include the PCF ID of the PCF currently serving the terminal device and the PLMN ID corresponding to the PCF. Similarly, in a roaming scenario, the deregistration notification includes identifiers of two PCFs. One (V-PCF) is located in a VPLMN and the other (H-PCF) is located in an HPLMN.

The second AMF sends the deregistration request message to the terminal device based on the deregistration notification received from the UDM. Correspondingly, the second AMF sends a deregistration notification response to the UDM, and sends event subscription cancellation information to the UDM. To be more specific, the second AMF initiates a PDU session release request to an SMF, the SMF releases a PDU session and responds to the second AMF, and the SMF initiates session management policy association termination, cancels the event subscription in the UDM, and cancels registration with the UDM. Similarly, the second AMF may initiate the AM policy association termination procedure, send a deregistration acceptance message to the terminal device, and initiate release of a signaling connection.

Step 603: The second AMF removes an association relationship with the PCF, where the PCF is a PCF currently serving the terminal device, and the PCF retains policy information of the terminal device.

In this embodiment, when the second AMF performs the deregistration procedure with the terminal device, the association relationship between the second AMF and the PCF is removed, but the PCF retains the policy information of the terminal device.

In this embodiment, to reduce signaling exchange, when performing the deregistration procedure with the terminal device, the second AMF may control the PCF serving the terminal device not to delete the internally stored policy information of the terminal device, such that when re-initiating registration subsequently, the second AMF may directly use the policy information of the terminal device that is stored by the PCF. This avoids a step in which the policy information of the terminal device needs to be re-obtained, and reduces signaling overheads.

Correspondingly, in this embodiment, the registration request message further includes the identifier of the PCF and the network identifier of the PCF. As shown in FIG. 6, step 502 may be implemented using the following step.

Step 604: The first AMF obtains the identifier of the PCF and the network identifier of the PCF from the registration request message of the terminal device based on the identifier of the terminal device.

In this embodiment of this application, when the terminal device initiates the registration request message to the access network, the registration request message includes the identifier of the PCF currently serving the terminal device and the network identifier of the PCF, for example, an identifier of a PLMN. Correspondingly, the access network may send, to the first AMF, the registration request message that includes the identifier of the PCF and the network identifier of the PCF. Therefore, in this embodiment, the first AMF may directly obtain the identifier of the PCF and the network identifier of the PCF from the received registration request message based on the identifier of the terminal device.

It may be understood that, in a roaming scenario, identifiers of PCFs currently serving the terminal device in the registration request message may include an identifier of a V-PCF and an identifier of an H-PCF. Correspondingly, the V-PCF is located in a VPLMN, and the H-PCF is located in an HPLMN. In this way, the first AMF may directly obtain the identifier of the V-PCF and the VPLMN of the V-PCF, and the identifier of the H-PCF and the HPLMN of the H-PCF from the registration request message.

According to the PCF selection method provided in this embodiment of this application, the second AMF performs the deregistration procedure with the terminal device. In this case, the second AMF removes the association relationship with the PCF, and the PCF is the PCF currently serving the terminal device. The PCF stores the policy information of the terminal device, and stores, in the terminal device, the ID of the PCF serving the terminal device (identified by an SUPI) before the terminal device deregisters and the PLMN ID of the network to which the PCF belongs, such that the PCF ID and the PLMN ID may be carried by the terminal device again during initial registration, and the first AMF may reuse, based on the PCF ID and the corresponding PLMN ID that are carried by the terminal device during initial registration, the PCF used by the terminal device before deregistration. In this way, the first AMF on the network side does not need to reselect a PCF for the terminal device performing initial registration, and does not need to re-obtain the policy information from the UDR, either. This reduces signaling exchange and resource consumption.

Figure 7C:
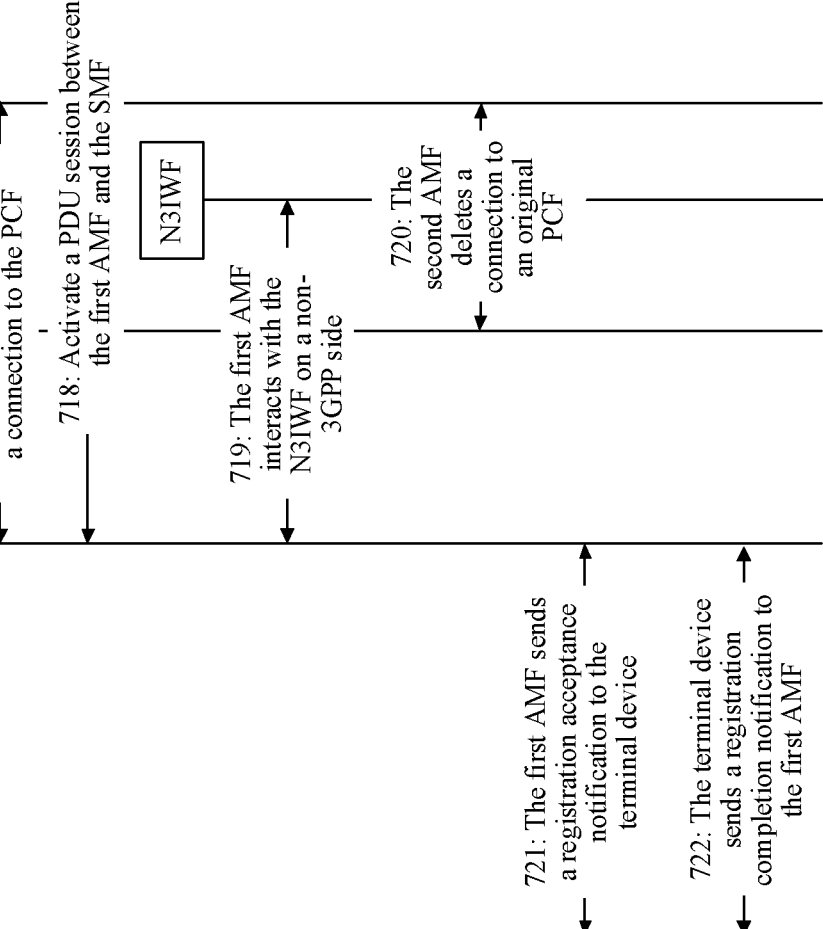

For example, based on the foregoing embodiments shown in FIG. 5 and FIG. 6, FIG. 7A to FIG. 7C are a schematic interaction diagram of Embodiment 3 of the PCF selection method according to an embodiment of this application. As shown in FIG. 7A to FIG. 7C, in this embodiment, the method may be implemented using the following steps.

701: The terminal device sends a registration request message to a RAN, where the registration request message includes a PCF ID of the PCF currently serving the terminal device and a corresponding PLMN ID.

702: The RAN determines the first AMF configured to serve the terminal device.

703: The RAN sends the registration request message to the first AMF, where the registration request message includes the PCF ID of the PCF currently serving the terminal device and the corresponding PLMN ID.

For example, if the AMF configured to serve the terminal device changes due to a reason such as movement of the terminal device, perform 704: The first AMF requests an MM context of the terminal device from the second AMF.

705: The second AMF sends the MM context to the first AMF, where the MM context includes the PCF ID.

706: The first AMF sends an encryption identifier obtaining request to the terminal device.

707: The terminal device sends an encryption identifier to the first AMF.

708: The first AMF selects an AUSF configured to perform authentication.

709: The first AMF implements authentication on the encryption identifier by interacting with the terminal device, the AUSF, and the UDM.

710: The first AMF notifies the second AMF that transfer of the MM context is completed.

711: The first AMF interacts with the terminal device, to obtain a device identifier of the terminal device.

712: The first AMF interacts with an EIR, to verify the obtained device identifier.

713: The first AMF selects the UDM.

714: The first AMF registers with the selected UDM and obtains subscription information.

715: The UDM notifies the second AMF to delete the MM context.

716: The first AMF selects a PCF, to be more specific, if a PLMN ID of the first AMF is consistent with a PLMN ID of a (V-) PCF, the first AMF preferentially reuses the PCF transferred by the terminal device.

717: The first AMF establishes a connection to the PCF.

For example, if a (V-) PCF ID received by the PCF is consistent with the PCF ID of the PCF, the PCF deletes a connection to the second AMF (that is, the PCF initiates the deletion procedure), but retains the context of the terminal device.

718: Activate a PDU session between the first AMF and the SMF.

719: The first AMF interacts with an N3IWF on a non-3GPP side.

In an example, if a UE context does not carry the PCF ID, perform 720: The second AMF deletes a connection to an original PCF (that is, the second AMF initiates the deletion procedure).

721: The first AMF sends a registration acceptance notification to the terminal device.

722: The terminal device sends a registration completion notification to the first AMF.

For non-exhaustive details and implementation principles of the steps in the embodiments of this application, refer to records in the foregoing embodiments. Details are not described herein again.

Figure 8:
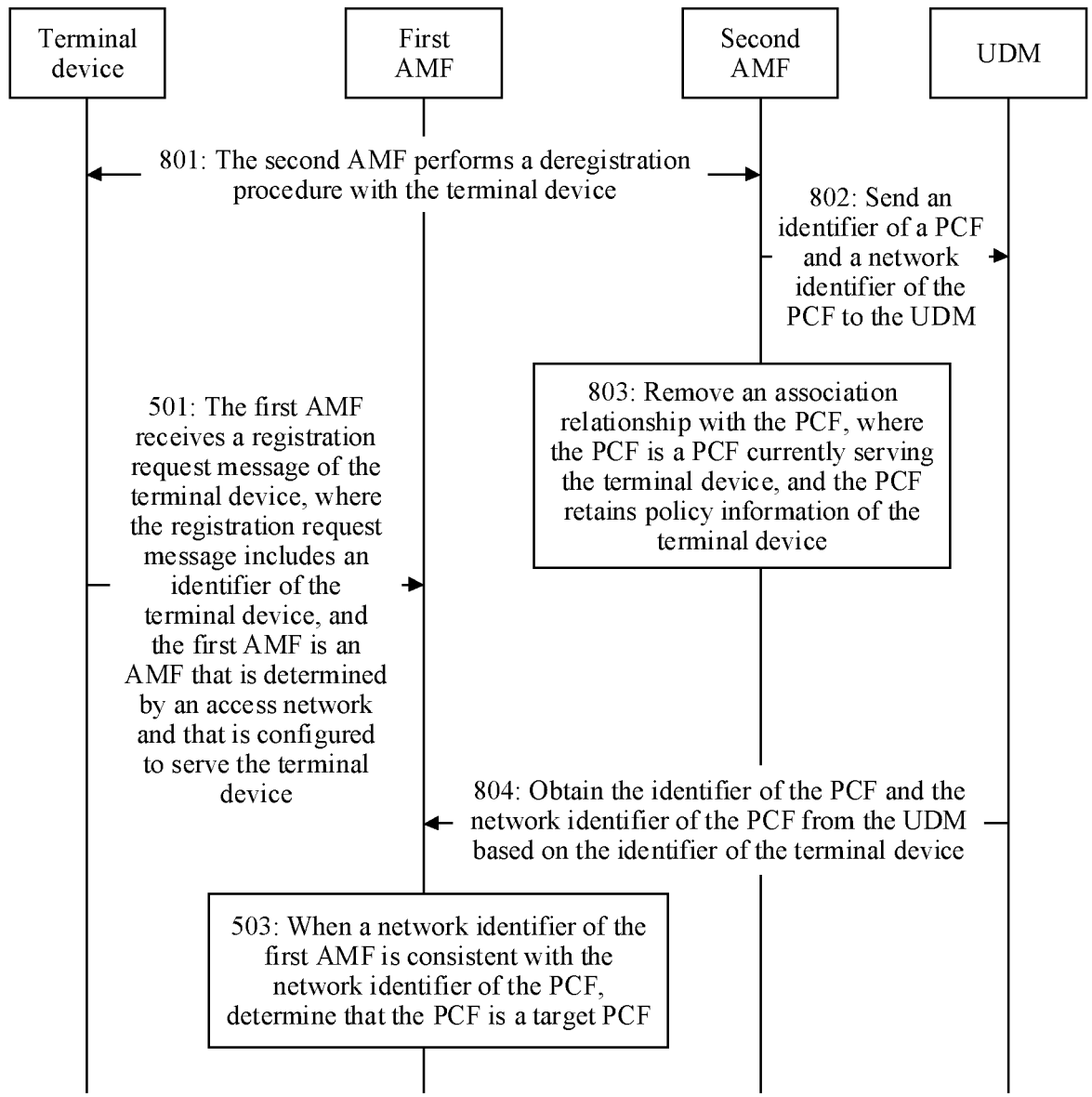
FIG. 8 is a schematic interaction diagram of Embodiment 4 of a PCF selection method according to an embodiment of this application.

For example, based on the foregoing embodiment in FIG. 5, FIG. 8 is a schematic interaction diagram of Embodiment 4 of the PCF selection method according to an embodiment of this application. A difference between the embodiment shown in FIG. 8 and the embodiment shown in FIG. 6 lies in that the identifier of the PCF currently serving the terminal device and the network identifier of the PCF are stored in the UDM. In this embodiment, information exchange between the terminal device, the first AMF, the second AMF, and the UDM is used for description. For example, as shown in FIG. 8, before step 501, the method may further include the following steps.

Step 801: The second AMF performs a deregistration procedure with the terminal device.

Step 802: The second AMF sends the identifier of the PCF and the network identifier of the PCF to the UDM.

For example, in this embodiment, when the deregistration procedure is performed between the terminal device and the second AMF, the second AMF initiates an AM policy connection termination procedure, and the PCF may only disconnect from the second AMF, but retains policy information such as a PSI of the terminal device. In addition, the second AMF may send the PCF ID and the PLMN ID corresponding to the PCF that are stored to the UDM.

In an example, the second AMF may send the identifier of the PCF and the network identifier of the PCF when initiating an unsubscription request to the UDM.

In another example, after selecting the PCF for the first time, the second AMF may write the PCF ID of the PCF serving the terminal device and the PLMN ID corresponding to the PCF into the UDM. It should be noted that, in this implementation, if the PCF serving the terminal device is to be replaced, the PCF ID associated with the terminal device and the PLMN ID corresponding to the PCF that are stored in the UDM both need to be updated. That is, when determining that the PCF serving the terminal device changes, the second AMF updates the identifier of the PCF and the network identifier of the PCF that are stored in the UDM.

For example, in a possible design of this embodiment, step 802 may be implemented using the following procedure:

The second AMF sends the identifier of the PCF and the network identifier of the PCF to the UDM using the unsubscription request.

In this embodiment, if the deregistration procedure is initiated by the terminal device, the terminal device initiates a deregistration request to the second AMF. Correspondingly, the second AMF initiates a PDU session release request to an SMF, the SMF releases the PDU session and responds to the second AMF, and the SMF initiates session management policy association termination, cancels event subscription in the UDM, and cancels registration with the UDM. In addition, the second AMF may initiate the AM policy association termination procedure. In this case, the second AMF may send the identifier of the PCF and the network identifier of the PCF that are stored to the UDM using the unsubscription request. Correspondingly, the second AMF sends a deregistration acceptance message to the terminal device, and the second AMF initiates release of a signaling connection between the second AMF and the terminal device.

Therefore, in this embodiment of this application, when receiving the registration request message sent by the terminal device, the first AMF may obtain the PCF ID and the PLMN ID of the PCF from the UDM. In this way, the first AMF may determine whether a PLMN ID of a network in which the first AMF is located is consistent with the obtained PLMN ID of the PCF. When the PLMN IDs are consistent, the first AMF may preferentially reuse the PCF transferred by the terminal device, to avoid re-obtaining.

Optionally, in another possible design of this embodiment, step 802 may be implemented using the following procedure.

After determining the PCF serving the terminal device, the second AMF sends the identifier of the PCF and the network identifier of the PCF to the UDM.

The identifier of the PCF and the network identifier of the PCF that are stored in the UDM are updated when the second AMF determines that the PCF of the terminal device changes.

In this embodiment of this application, if the deregistration procedure is initiated by the UDM on the network side, when receiving a deregistration notification sent by the UDM, the second AMF may send a deregistration request message to the terminal device, and simultaneously send a deregistration notification response to the UDM, and the second AMF cancels event subscription in the UDM, and sends the PCF ID and the corresponding PLMN ID that are stored by the AMF to the UDM. Correspondingly, the second AMF initiates a PDU session release request to an SMF, the SMF releases a PDU session and responds to the second AMF, and the SMF initiates session management policy association termination, cancels the event subscription in the UDM, and cancels registration with the UDM. Similarly, the second AMF may initiate the AM policy association termination procedure, send a deregistration acceptance message to the terminal device, and initiate release of a signaling connection between the second AMF and the terminal device.

Step 803: The second AMF removes an association relationship with the PCF, where the PCF is a PCF currently serving the terminal device, and the PCF retains policy information of the terminal device.

Correspondingly, in this embodiment, step 502 may be implemented using the following step.

Step 804: The first AMF obtains the identifier of the PCF and the network identifier of the PCF from the UDM based on the identifier of the terminal device.

In this embodiment of this application, if the deregistration request is executed between the second AMF configured to serve the terminal device and the terminal device, the second AMF may store, in the UDM, the identifier of the PCF currently serving the terminal device and the network identifier of the PCF. In this way, after the access network determines the first AMF based on the registration request message received from the terminal device, the first AMF may directly obtain the identifier of the PCF and the network identifier of the PCF from the UDM based on the identifier of the terminal device, and does not need to reselect a PCF through an NRF, and does not need to re-obtain, through the reselected PCF from a UDR, information such as a PSI of the terminal device and policy content corresponding to the PSI, either.

For implementation principles of step 801 and step 803 in this embodiment, refer to records in step 601 and step 603 in the embodiment shown in FIG. 6. Details are not described herein again.

According to the PCF selection method provided in this embodiment of this application, the second AMF performs the deregistration procedure with the terminal device. In this case, the second AMF removes the association relationship with the PCF, and the PCF is the PCF currently serving the terminal device. The PCF retains the policy information of the terminal device, and stores, in the UDM, the identifier of the PCF corresponding to the terminal device and the network identifier of the PCF before the terminal device deregisters. When the terminal device performs initial registration, the first AMF may reuse, based on the PCF ID and the corresponding PLMN ID that are obtained from the UDM, the PCF before the terminal device deregisters. In this way, the network side does not need to reselect a PCF for the terminal device performing initial registration, and does not need to re-obtain the policy information from the UDR, either. Therefore, signaling exchange is reduced.

Figure 9A:
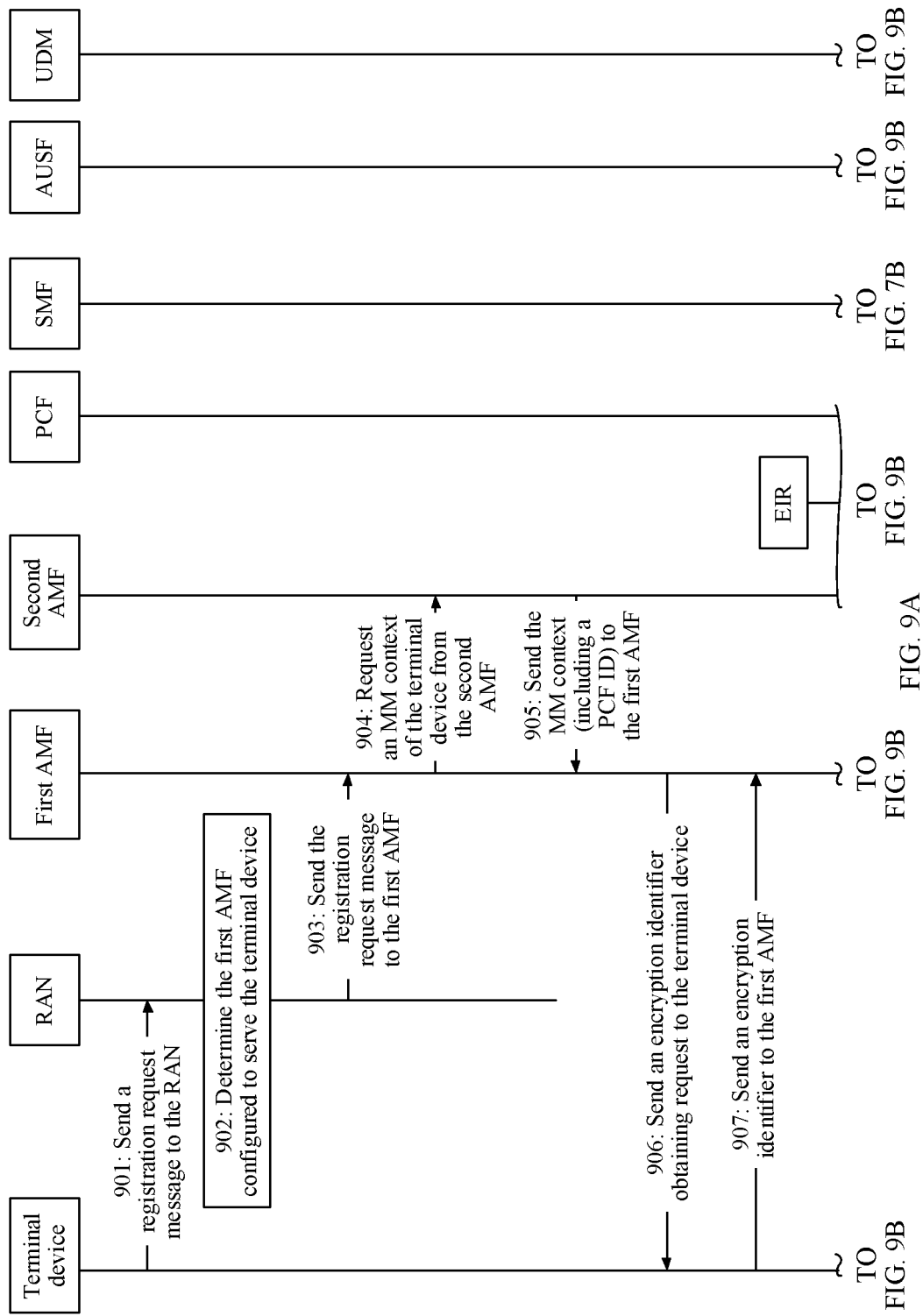
FIG. 9A to FIG. 9C are a schematic interaction diagram of Embodiment 5 of a PCF selection method according to an embodiment of this application.
Figure 9B:
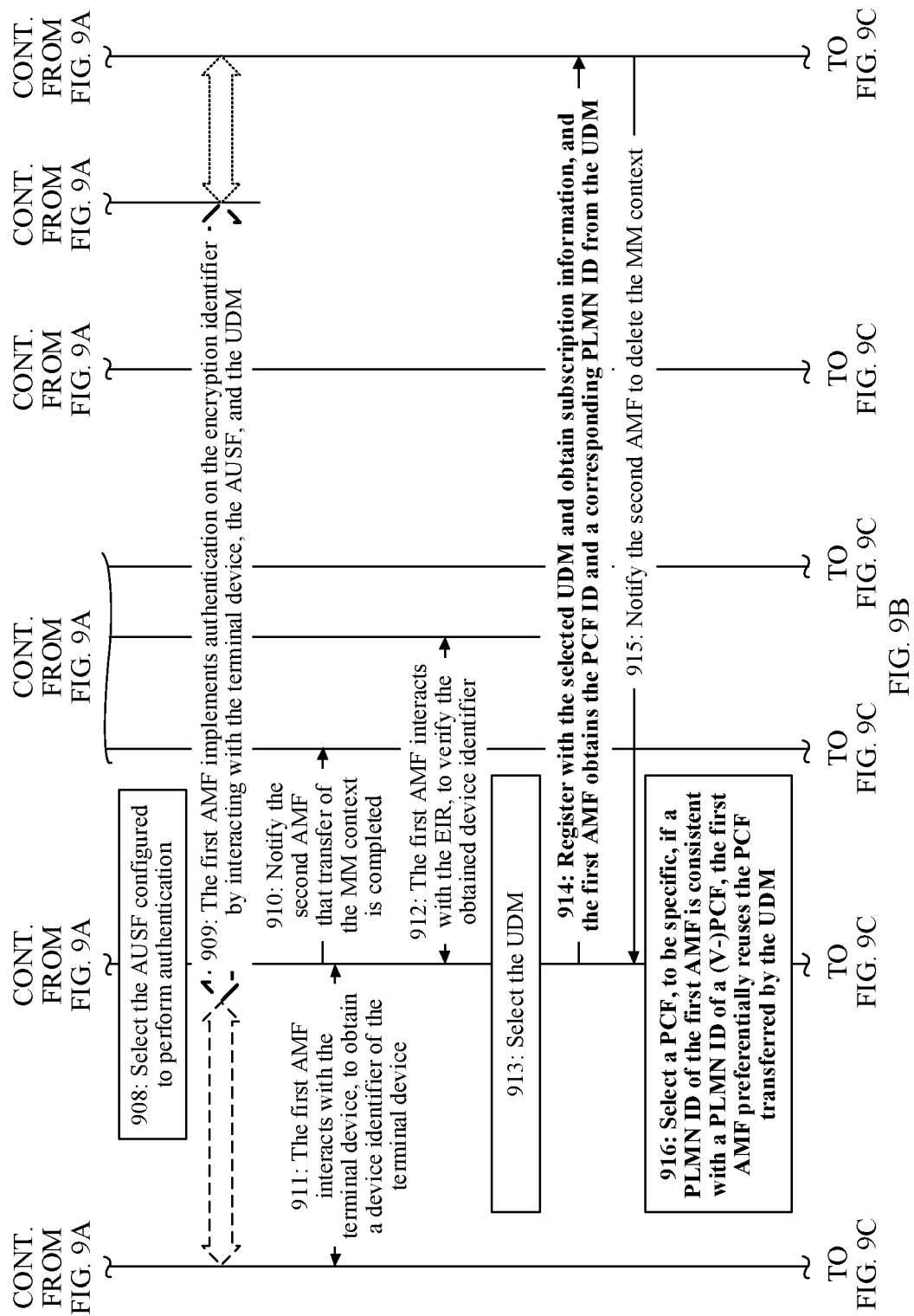
Figure 9C:
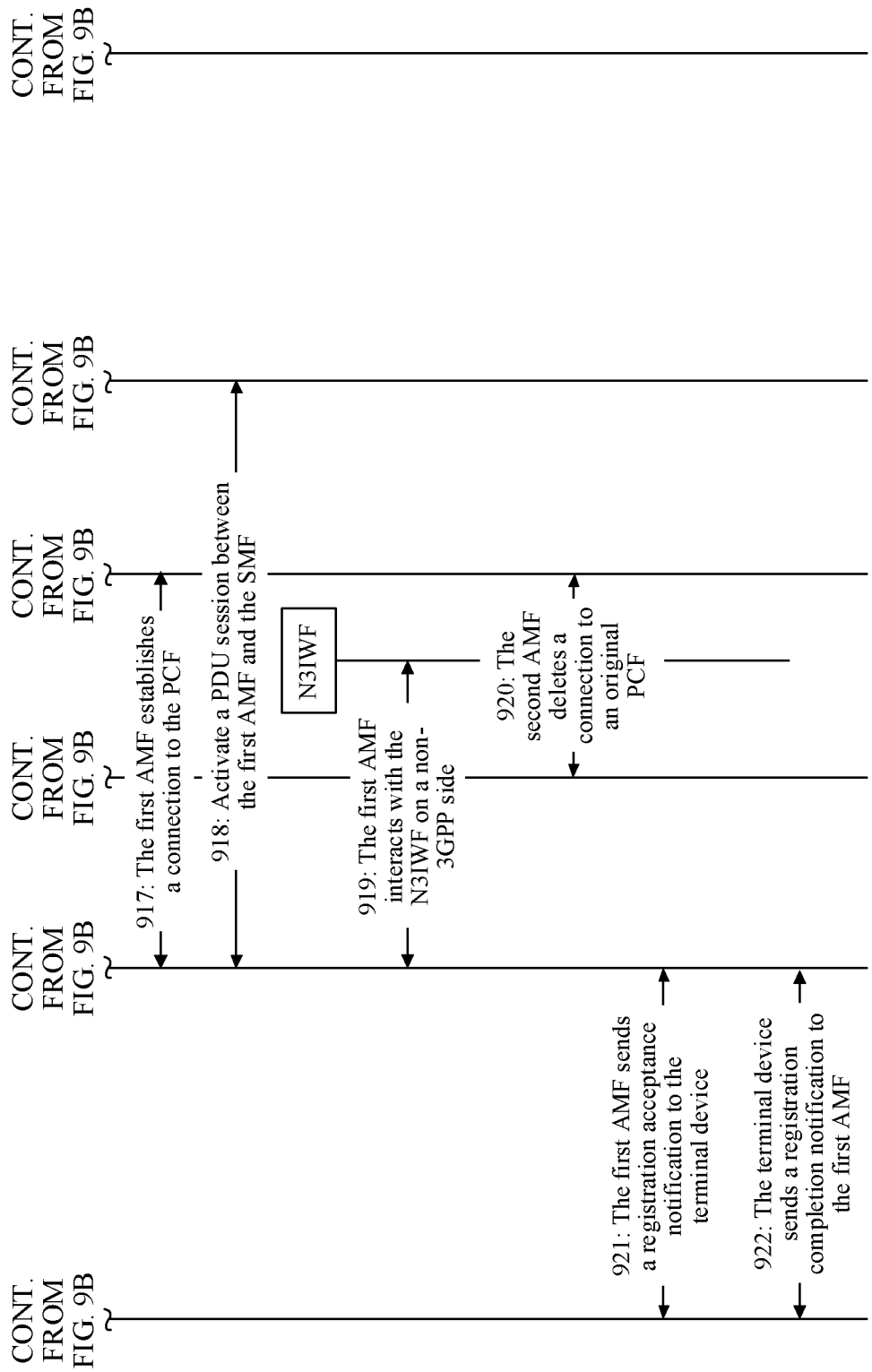

For example, based on the foregoing embodiments shown in FIG. 5 and FIG. 8, FIG. 9A to FIG. 9C are a schematic interaction diagram of Embodiment 5 of the PCF selection method according to an embodiment of this application. As shown in FIG. 9A to FIG. 9C, in this embodiment, the method may be implemented using the following steps.

901: The terminal device sends a registration request message to a RAN.

902: The RAN determines the first AMF configured to serve the terminal device.

903: The RAN sends the registration request message to the first AMF.

For example, if the AMF configured to serve the terminal device changes due to a reason such as movement of the terminal device, perform 904: The first AMF requests an MM context of the terminal device from the second AMF.

905: The second AMF sends the MM context to the first AMF, where the MM context includes the PCF ID.

906: The first AMF sends an encryption identifier obtaining request to the terminal device.

907: The terminal device sends an encryption identifier to the first AMF.

908: The first AMF selects an AUSF configured to perform authentication.

909: The first AMF implements authentication on the encryption identifier by interacting with the terminal device, the AUSF, and the UDM.

910: The first AMF notifies the second AMF that transfer of the MM context is completed.

911: The first AMF interacts with the terminal device, to obtain a device identifier of the terminal device.

912: The first AMF interacts with an EIR, to verify the obtained device identifier.

913: The first AMF selects the UDM.

914: The first AMF registers with the selected UDM and obtains subscription information, and the first AMF obtains the PCF ID and the corresponding PLMN ID from the UDM.

915: The UDM notifies the second AMF to delete the MM context.

916: The first AMF selects a PCF, to be more specific, if a PLMN ID of the first AMF is consistent with a PLMN ID of a (V-) PCF, the first AMF preferentially reuses the PCF transferred by the UDM.

917: The first AMF establishes a connection to the PCF. If a (V-) PCF ID received by the PCF is consistent with the PCF ID of the PCF, the PCF deletes a connection to the second AMF (that is, the PCF initiates the deletion procedure), but retains the context of the terminal device.

918: Activate a PDU session between the first AMF and the SMF.

919: The first AMF interacts with an N3IWF on a non-3GPP side.

In an example, if a UE context does not carry the PCF ID, perform 920: The second AMF deletes a connection to an original PCF (that is, the second AMF initiates the deletion procedure).

921: The first AMF sends a registration acceptance notification to the terminal device.

922: The terminal device sends a registration completion notification to the first AMF.

For non-exhaustive details and implementation principles of the steps in the embodiments of this application, refer to records in the foregoing embodiments. Details are not described herein again.

Figure 10:
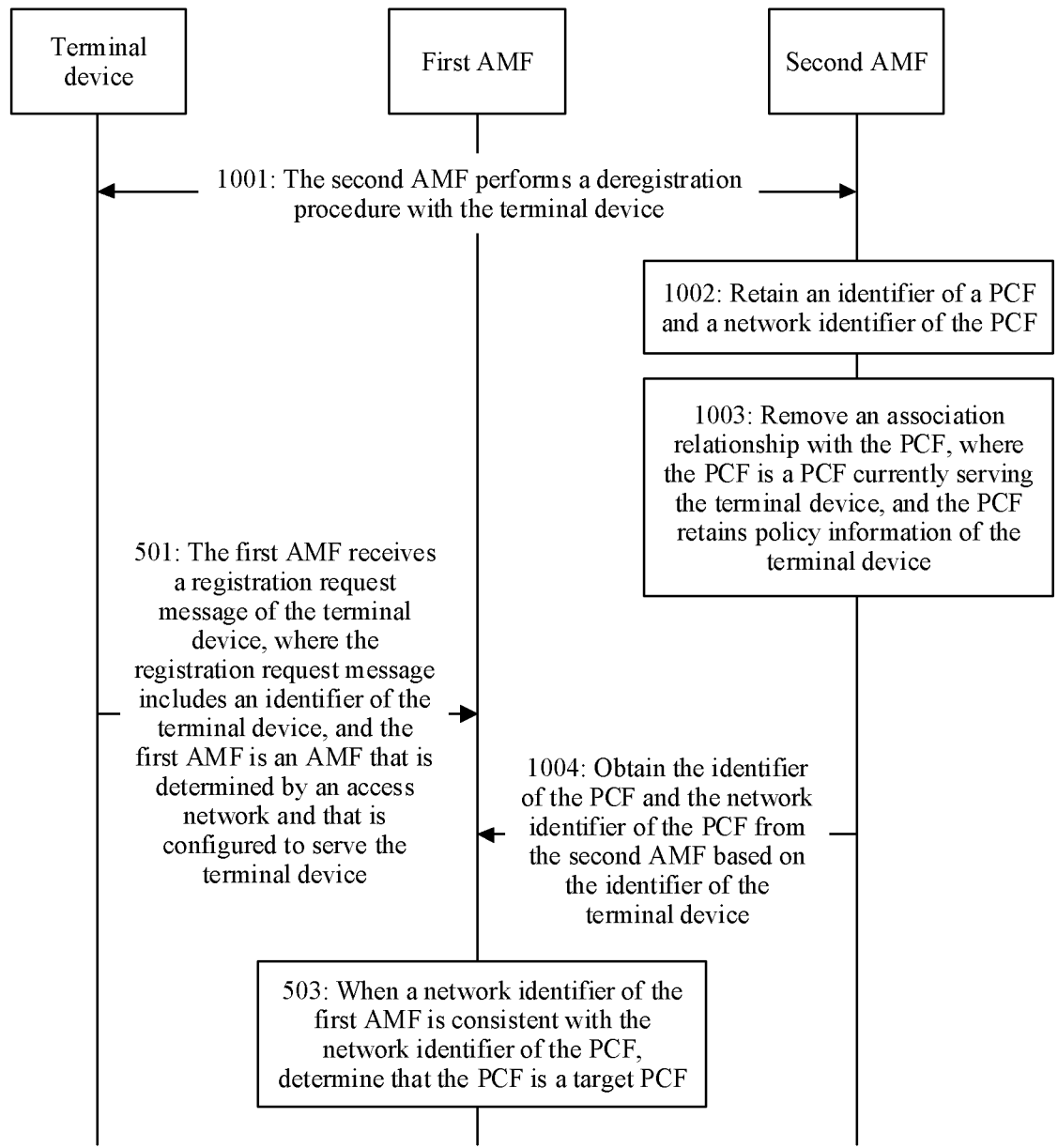
FIG. 10 is a schematic interaction diagram of Embodiment 6 of a PCF selection method according to an embodiment of this application.

For example, based on the foregoing embodiment in FIG. 5, FIG. 10 is a schematic interaction diagram of Embodiment 6 of a PCF selection method according to an embodiment of this application. A difference between the embodiment shown in FIG. 10 and the embodiments shown in FIG. 6 and FIG. 8 lies in that the identifier of the PCF currently serving the terminal device and the network identifier of the PCF are stored in the second AMF before the AMF of the terminal device is replaced. In this embodiment, information exchange between the terminal device, the second AMF configured to serve the terminal device before the terminal device accesses the access network, and the first AMF that is determined by the access network and that is configured to serve the terminal device is used for description. In this embodiment, as shown in FIG. 6, before step 501, the method may further include the following steps.

Step 1001: The second AMF performs a deregistration procedure with the terminal device.

Step 1002: The second AMF retains the identifier of the PCF and the network identifier of the PCF.

For example, in this embodiment, when the deregistration procedure is performed between the terminal device and the second AMF, the second AMF initiates an AM policy connection termination procedure, and the PCF may only disconnect from the second AMF, but retains policy information such as a PSI of the terminal device. In addition, the second AMF may retain the PCF ID and the network identifier of the PCF that are stored. In this way, during initial registration of the terminal device, the first AMF may directly obtain the PCF ID and the corresponding PLMN ID from the second AMF.

For example, in a possible design of this embodiment, if the deregistration procedure is initiated by the terminal device, the terminal device initiates a deregistration request to the second AMF. Correspondingly, the second AMF initiates a PDU session release request to an SMF, the SMF releases the PDU session and responds to the second AMF, and the SMF initiates session management policy association termination, cancels event subscription in the UDM, and cancels registration with the UDM. In addition, the second AMF may initiate the AM policy association termination procedure. However, in this embodiment, the second AMF does not retain the identifier of the PCF and the network identifier of the PCF that are stored. In addition, in this embodiment, the second AMF sends a deregistration acceptance message to the terminal device, and the second AMF initiates release of a signaling connection between the second AMF and the terminal device.

Therefore, in this embodiment of this application, when terminal device performs initial registration with the network, when receiving the registration request message sent by the terminal device, the first AMF may obtain the PCF ID and the PLMN ID of the PCF from the second AMF. In this way, the first AMF may determine whether a PLMN ID of a network in which the first AMF is located is consistent with the obtained PLMN ID of the PCF. When the PLMN IDs are consistent, the first AMF may preferentially reuse the PCF obtained by the terminal device, to avoid re-obtaining.

In another possible design of this embodiment, if the deregistration procedure is initiated by the UDM on the network side, the second AMF receives a deregistration notification sent by the UDM, sends a deregistration request message to the terminal device, simultaneously sends a deregistration notification response to the UDM, and cancels event subscription in the UDM. Correspondingly, the second AMF initiates a PDU session release request to an SMF, the SMF releases a PDU session and responds to the second AMF, and the SMF initiates session management policy association termination, cancels event subscription in the UDM, and cancels registration with the UDM. Similarly, the second AMF may initiate the AM policy association termination procedure, but does not delete the PCF ID and the corresponding PLMN ID that are stored. Then, the second AMF sends a deregistration acceptance message to the terminal device, and the second AMF initiates release of a signaling connection between the second AMF and the terminal device.

Step 1003: The second AMF removes an association relationship with the PCF, where the PCF is a PCF currently serving the terminal device, and the PCF retains policy information of the terminal device.

Correspondingly, in this embodiment, as shown in FIG. 10, step 502 may be implemented using the following step.

Step 1004: The first AMF obtains the identifier of the PCF and the network identifier of the PCF from the second AMF based on the identifier of the terminal device.

Optionally, in this embodiment of this application, if the deregistration request is executed between the second AMF configured to serve the terminal device and the terminal device, the second AMF does not delete the PCF ID and the corresponding PLMN ID that are stored. In this case, when the terminal device performs initial registration, the first AMF may directly obtain the PCF ID and the corresponding PLMN ID from the second AMF based on the identifier of the terminal device in the registration request message.

For implementation principles of step 1001 and step 1003 in this embodiment, refer to records in step 601 and step 603 in the embodiment shown in FIG. 6. Details are not described herein again.

According to the PCF selection method provided in this embodiment of this application, the second AMF performs the deregistration procedure with the terminal device. In this case, the second AMF removes the association relationship with the PCF, and the PCF is the PCF currently serving the terminal device. The PCF retains the policy information of the terminal device, and stores, in the second AMF (the old AMF), the identifier of the PCF corresponding to the terminal device and the network identifier of the PCF before the terminal device deregisters. When the terminal device performs initial registration, the first AMF may reuse, based on the PCF ID and the corresponding PLMN ID that are obtained from the second AMF (the old AMF), the PCF before the terminal device deregisters. In this way, the network side does not need to reselect a PCF for the terminal device performing initial registration, and does not need to re-obtain the policy information from the UDR, either. Therefore, signaling overheads are reduced.

Figure 11A:
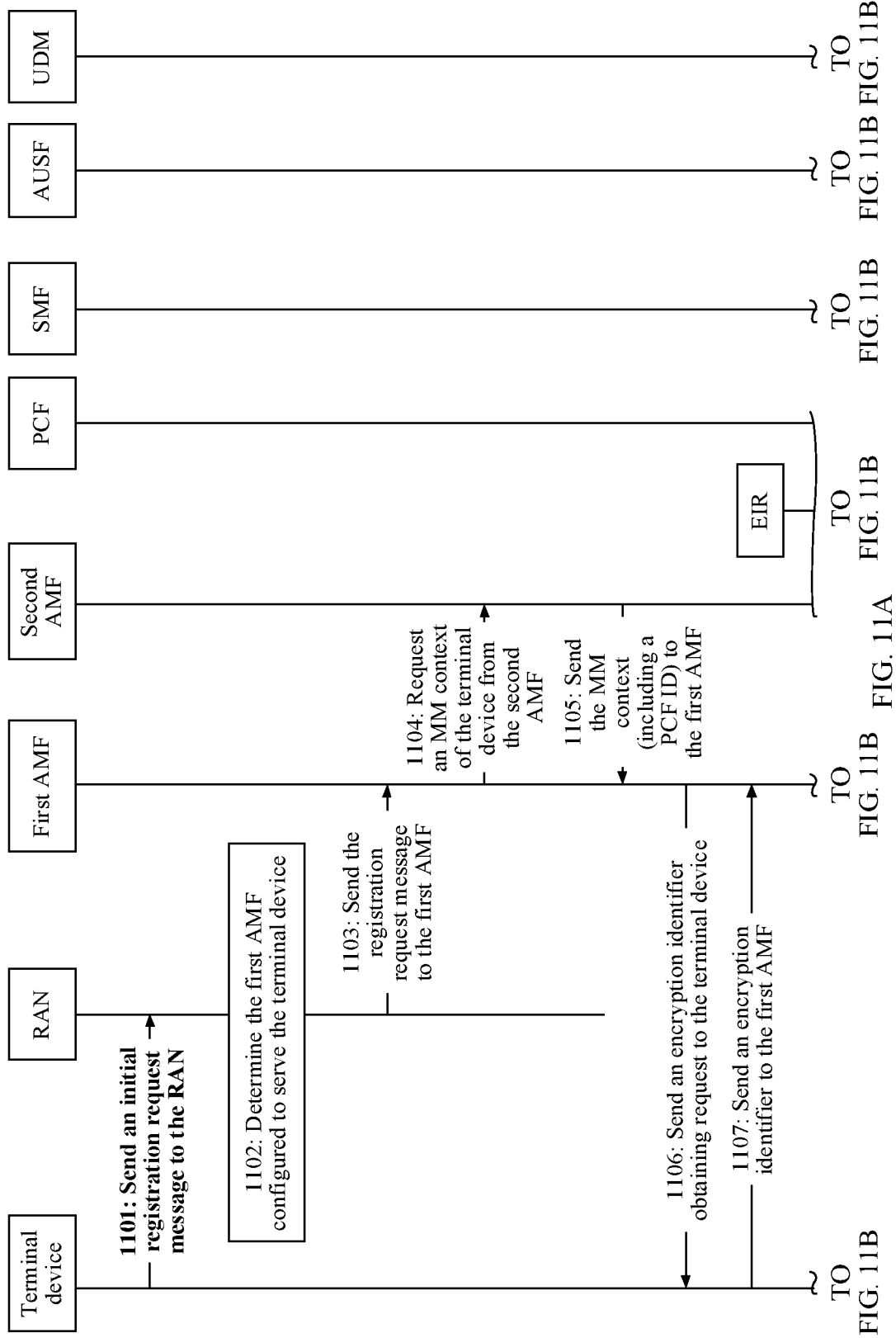
FIG. 11A to FIG. 11C are a schematic interaction diagram of Embodiment 7 of a PCF selection method according to an embodiment of this application.
Figure 11B:
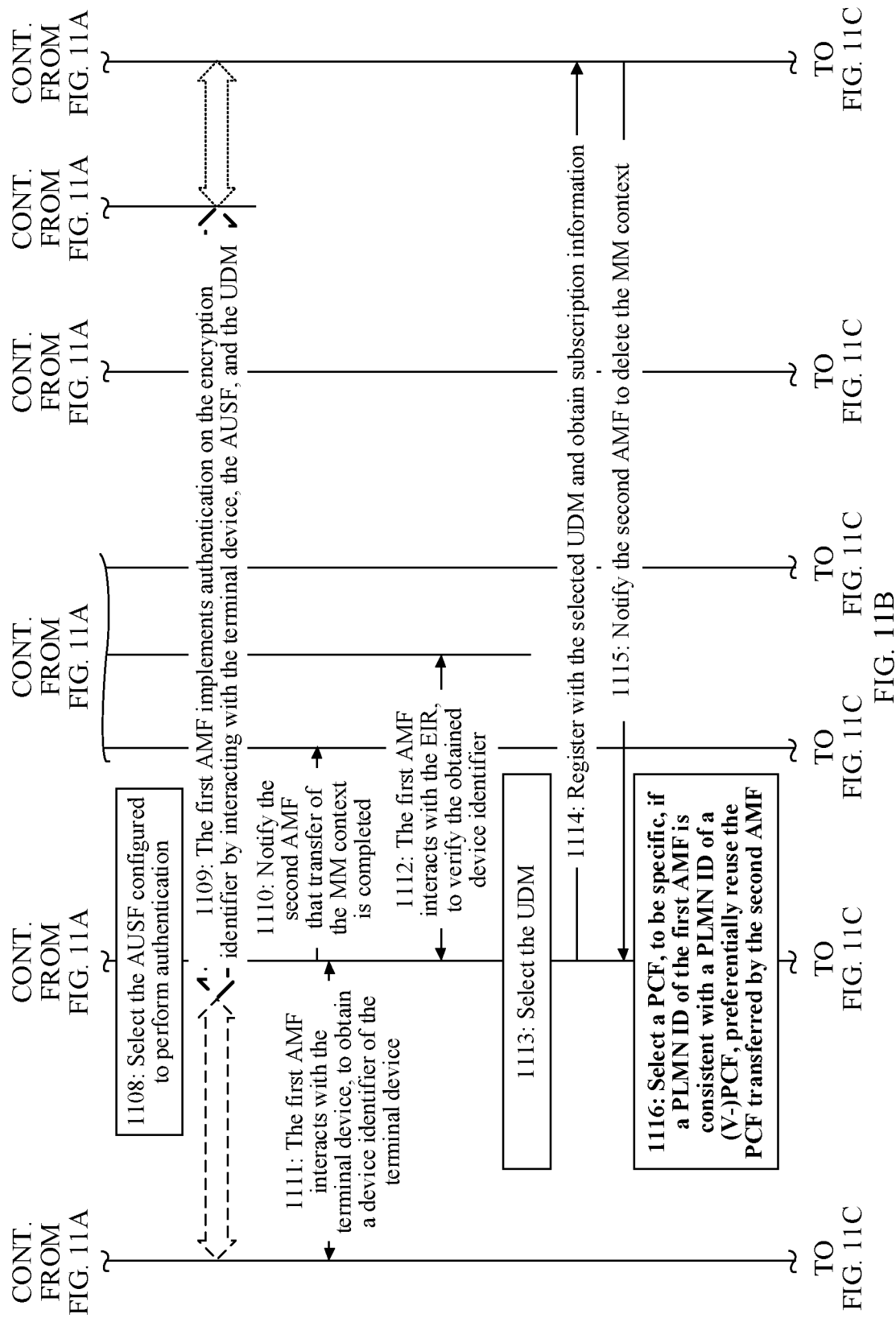
Figure 11C:
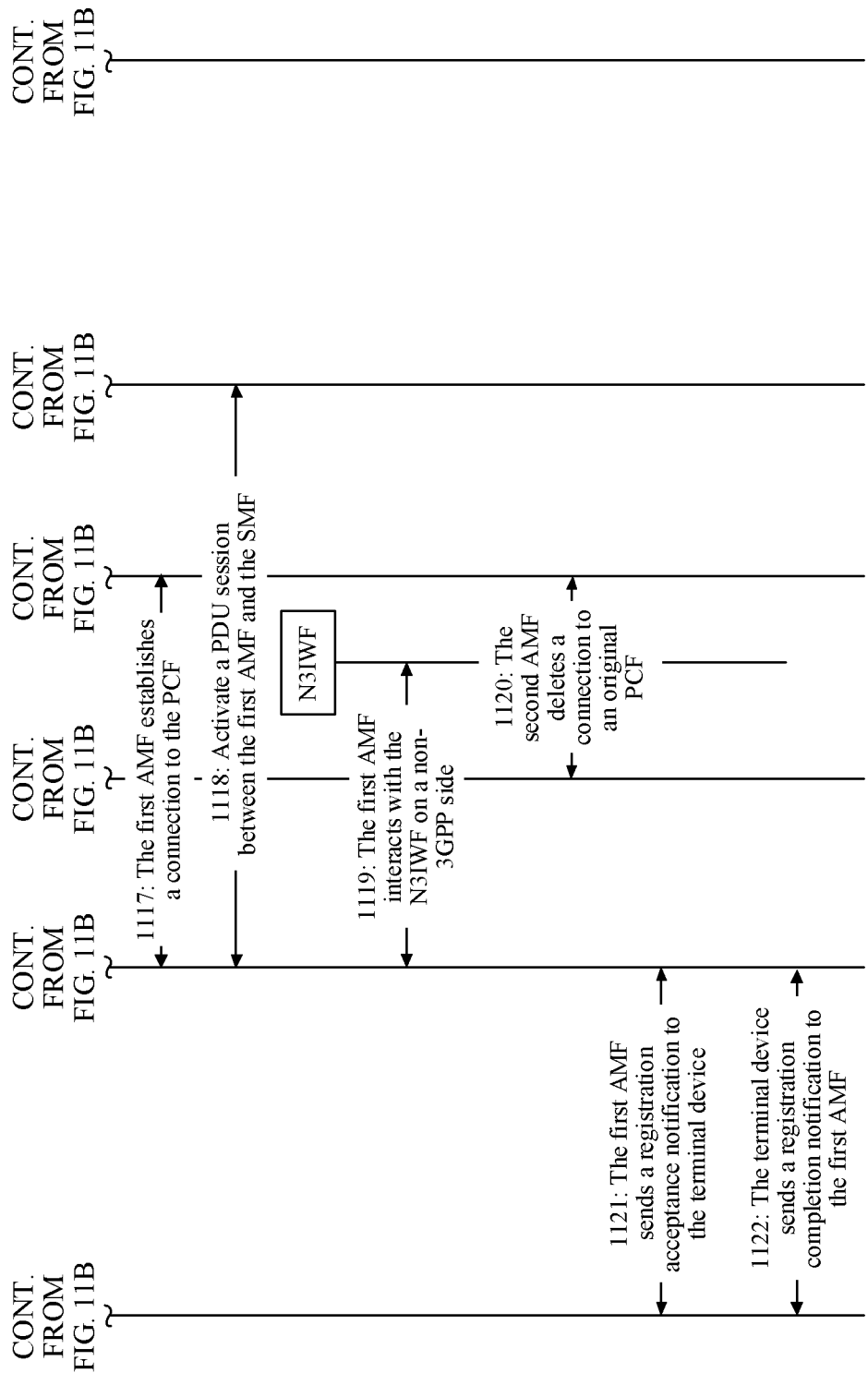

For example, based on the foregoing embodiments shown in FIG. 5 and FIG. 10, FIG. 11A to FIG. 11C are a schematic interaction diagram of Embodiment 7 of the PCF selection method according to an embodiment of this application. As shown in FIG. 11A to FIG. 11C, in this embodiment, the method may be implemented using the following steps.

1101: The terminal device sends an initial registration request message to a RAN.

It should be noted that, in this embodiment, an application scenario in which the terminal device initiates an initial registration request is used for description, and the initial registration request definitely does not include a PCF ID.

1102: The RAN determines the first AMF configured to serve the terminal device.

1103: The RAN sends the registration request message to the first AMF.

For example, if the AMF configured to serve the terminal device changes due to a reason such as movement of the terminal device, perform 1104: The first AMF requests an MM context of the terminal device from the second AMF.

1105: The second AMF sends the MM context to the first AMF, where the MM context includes the PCF ID.

1106: The first AMF sends an encryption identifier obtaining request to the terminal device.

1107: The terminal device sends an encryption identifier to the first AMF.

1108: The first AMF selects an AUSF configured to perform authentication.

1109: The first AMF implements authentication on the encryption identifier by interacting with the terminal device, the AUSF, and the UDM.

1110: The first AMF notifies the second AMF that transfer of the MM context is completed.

1111: The first AMF interacts with the terminal device, to obtain a device identifier of the terminal device.

1112: The first AMF interacts with an EIR, to verify the obtained device identifier.

1113: The first AMF selects the UDM.

1114: The first AMF registers with the selected UDM and obtains subscription information.

1115: The UDM notifies the second AMF to delete the MM context.

1116: The first AMF selects a PCF, to be more specific, if a PLMN ID of the first AMF is consistent with a PLMN ID of a (V-) PCF, the first AMF preferentially reuses the PCF transferred by the second AMF.

1117: The first AMF establishes a connection to the PCF. If a (V-) PCF ID received by the PCF is consistent with the PCF ID of the PCF, the PCF deletes a connection to the second AMF (that is, the PCF initiates the deletion procedure), but retains the MM context of the terminal device.

1118: Activate a PDU session between the first AMF and the SMF.

1119: The first AMF interacts with an N3IWF on a non-3GPP side.

In an example, if a UE context does not carry the PCF ID, perform 1120: The second AMF deletes a connection to an original PCF (that is, the second AMF initiates the deletion procedure).

1121: The first AMF sends a registration acceptance notification to the terminal device.

1122: The terminal device sends a registration completion notification to the first AMF.

For non-exhaustive details and implementation principles of the steps in the embodiments of this application, refer to records in the foregoing embodiments. Details are not described herein again.

In conclusion, in this embodiment of this application, when deregistration is performed between the terminal device and the second AMF, the PCF does not delete stored policy information such as a PSI of the UE. It should be noted that, in this embodiment, the policy information stored by the PCF may be deleted when the second AMF initiates a clear request to the UDM and simultaneously initiates a clear request to the PCF.

In this embodiment, in an example, after the terminal device deregisters with the second AMF (the old AMF), the terminal device may store the PCF ID and the corresponding PLMN ID. In this way, the terminal device may carry the PCF ID and the corresponding PLMN ID that are stored during initial registration, such that the first AMF (the new AMF) reselects the PCF based on the PCF ID and the corresponding PLMN ID.

In another example, the second AMF (the old AMF) may store the PCF ID and the corresponding PLMN ID in the UDM. In this way, when the terminal device performs initial registration, the first AMF (the new AMF) may obtain the stored PCF ID from the UDM for reuse.

In still another example, the second AMF (the old AMF) may retain the PCF ID and the PLMN ID that are stored during deregistration, such that when the terminal device performs initial registration, the first AMF (the new AMF) may obtain the stored PCF ID from the second AMF (the old AMF) for reuse.

In this embodiment of this application, during initial registration of the terminal device, the first AMF (the new AMF) does not need to reselect a PCF through an NRF, and may directly reuse a previous PCF. The PCF does not need to re-obtain the information such as the PSI of the UE and the policy content corresponding to the PSI from the UDR. This reduces signaling.

It may be understood that the technical solutions of this application may be further applied to selection of a short message service (SMS) function (SMSF) network element in an initial registration process, that is, the PCF in this application is replaced with the SMSF. A difference from the technical solutions of this application is that: In a roaming scenario, there is only one SMSF in a VPLMN. An implementation principle of the SMSF network element in the initial registration process is similar to the PCF selection method in this application. Details are not described herein again.

Apparatus embodiments of this application are described below, and may be used to perform the method embodiments of this application. For details not disclosed in the apparatus embodiments of this application, refer to the method embodiments of this application.

Figure 12:
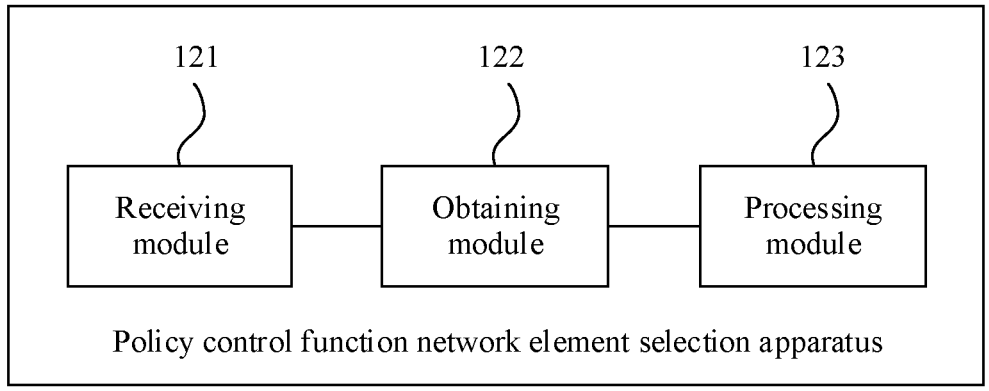
FIG. 12 is a schematic diagram of Embodiment 1 of a structure of a policy control function network element selection apparatus according to an embodiment of this application.

FIG. 12 is a schematic diagram of Embodiment 1 of a structure of a policy control function network element selection apparatus according to an embodiment of this application. The apparatus may be integrated into a first access and mobility management function network element, or may be implemented through a first access and mobility management function network element. As shown in FIG. 12, the apparatus may include a receiving module 121, an obtaining module 122, and a processing module 123. The receiving module 121 is configured to receive a registration request message of a terminal device, where the registration request message includes an identifier of the terminal device. The obtaining module 122 is configured to obtain, based on the identifier of the terminal device, an identifier of a policy control function network element currently serving the terminal device and a network identifier of the policy control function network element. The processing module 123 is configured to: when a network identifier of the first access and mobility management function network element is consistent with the network identifier of the policy control function network element, determine that the policy control function network element is a target policy control function network element, where the first access and mobility management function network element is an access and mobility management function network element that is determined by an access network and that is configured to serve the terminal device.

In a possible design of this embodiment, the registration request message further includes the identifier of the policy control function network element and the network identifier of the policy control function network element.

Correspondingly, the obtaining module 122 is configured to obtain the identifier of the policy control function network element and the network identifier of the policy control function network element from the registration request message of the terminal device based on the identifier of the terminal device.

In another possible design of this embodiment, the obtaining module 122 is configured to obtain the identifier of the policy control function network element and the network identifier of the policy control function network element from a unified data management network element based on the identifier of the terminal device.

In still another possible design of this embodiment, the obtaining module 122 is configured to obtain the identifier of the policy control function network element and the network identifier of the policy control function network element from a second access and mobility management function network element based on the identifier of the terminal device, where the second access and mobility management function network element is an access and mobility management function network element that is configured to serve the terminal device before the terminal device requests to access the access network.

Optionally, in this embodiment of this application, the receiving module 121 is configured to receive the registration request message sent by the terminal device through the access network.

The apparatus in this embodiment may be configured to execute implementation solutions of the first access and mobility management function network element in the method embodiments shown in FIG. 5 to FIG. 11A to FIG. 11C. Implementations and technical effects are similar, and details are not described herein again.

Figure 13:
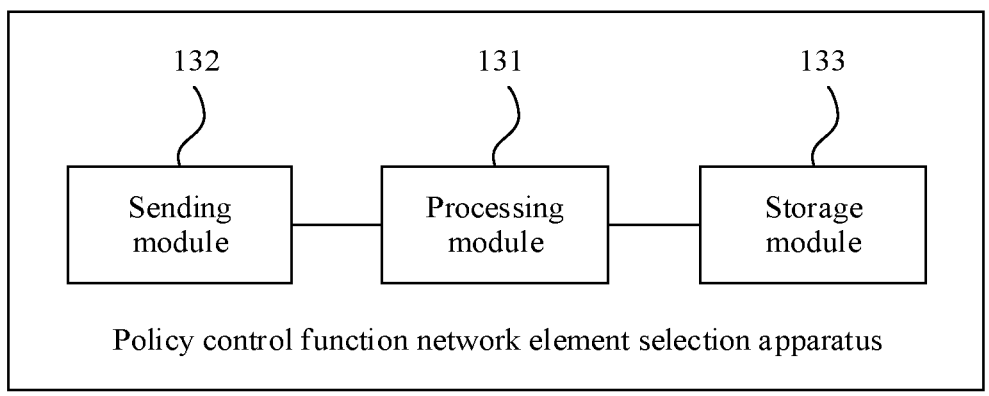
FIG. 13 is a schematic diagram of Embodiment 2 of a structure of a policy control function network element selection apparatus according to an embodiment of this application.

FIG. 13 is a schematic diagram of Embodiment 2 of a structure of a policy control function network element selection apparatus according to an embodiment of this application. The apparatus may be integrated into a second access and mobility management function network element, or may be implemented through a second access and mobility management function network element. As shown in FIG. 13, the apparatus may include a processing module 131.

The processing module 131 is configured to: perform a deregistration procedure between the second access and mobility management function network element and a terminal device, where the second access and mobility management function network element is an access and mobility management function network element that is configured to serve the terminal device before the terminal device requests to access an access network; and remove an association relationship with a policy control function network element, where the policy control function network element is a policy control function network element currently serving the terminal device, and where the policy control function network element retains policy information of the terminal device.

In this embodiment, as shown in FIG. 13, the apparatus may further include a sending module 132.

In a possible design of this embodiment, the sending module 132 is configured to: before the processing module 131 removes the association relationship with the policy control function network element, send an identifier of the policy control function network element and a network identifier of the policy control function network element to the terminal device.

In another possible design of this embodiment, the sending module 132 is configured to: before the processing module 131 removes the association relationship with the policy control function network element, send an identifier of the policy control function network element and a network identifier of the policy control function network element to a unified data management network element.

In this possible design, the processing module 131 is further configured to: when the second access and mobility management function network element determines that the policy control function network element serving the terminal device changes, update the identifier of the policy control function network element and the network identifier of the policy control function network element that are stored in the unified data management network element.

Optionally, in this embodiment, as shown in FIG. 13, the apparatus may further include a storage module 133.

The storage module 133 is further configured to retain the identifier of the policy control function network element and the network identifier of the policy control function network element.

The apparatus in this embodiment may be configured to execute implementation solutions of the second access and mobility management function network element in the method embodiments shown in FIG. 5 to FIG. 11A to FIG. 11C. Implementations and technical effects are similar, and details are not described herein again.

Figure 14:
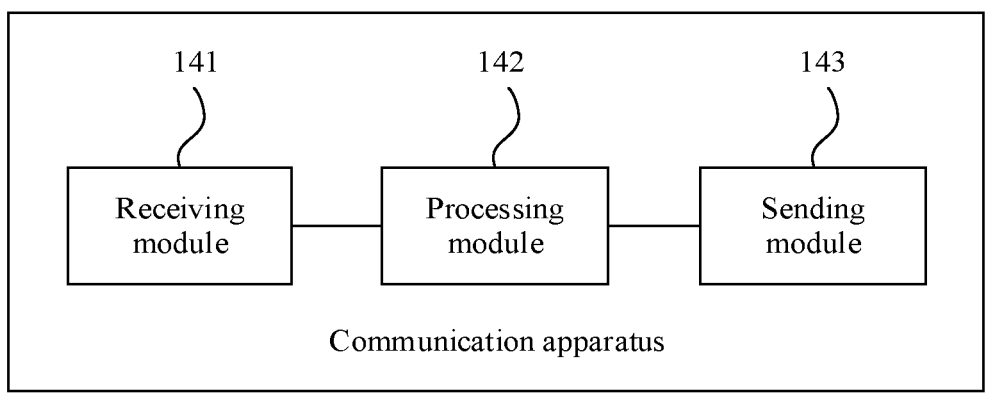
FIG. 14 is a schematic diagram of Embodiment 1 of a structure of a communication apparatus according to an embodiment of this application.

FIG. 14 is a schematic diagram of Embodiment 1 of a structure of a communication apparatus according to an embodiment of this application. The apparatus may be integrated in a terminal device, or may be implemented through a terminal device. In addition, the communication apparatus may alternatively be a chip. As shown in FIG. 14, the communication apparatus may include a receiving module 141, a processing module 142, and a sending module 143.

The receiving module 141 is configured to receive an identifier of a policy control function network element and a network identifier of the policy control function network element that are sent by a second access and mobility management function network element, where the policy control function network element is a policy control function network element currently serving the terminal device, and the second access and mobility management function network element is an access and mobility management function network element that is configured to serve the terminal device before the terminal device requests to access an access network.

The processing module 142 is configured to send a registration request message to a first access and mobility management function network element using the sending module through the access network, where the registration request message includes the identifier of the policy control function network element and the network identifier of the policy control function network element, and where the first access and mobility management function network element is an access and mobility management function network element that is determined by the access network and that is configured to serve the terminal device.

The registration request message is used to indicate that the first access and mobility management function network element determines a target policy control function network element based on a network identifier of the first access and mobility management function network element and the network identifier of the policy control function network element.

The apparatus in this embodiment may be configured to execute the implementation solutions of the terminal device in the method embodiments shown in FIG. 5 to FIG. 11A to FIG. 11C. Implementations and technical effects are similar, and details are not described herein again.

It should be noted and understood that division of the modules of the foregoing apparatus is merely logic function division. During actual implementation, some or all modules may be integrated into one physical entity, or the modules may be physically separated. In addition, these modules may be all implemented in a form of software invoked by a processing element, or may be all implemented in a form of hardware. Alternatively, some modules may be implemented in a form of software invoked by a processing element, and some modules are implemented in a form of hardware. For example, the processing module may be a separately disposed processing element, or may be integrated into a chip of the foregoing apparatus for implementation. In addition, the processing module may be stored in a memory of the foregoing apparatus in a form of program code, and is invoked by a processing element of the foregoing apparatus to perform a function of the processing module. Implementations of other modules are similar. In addition, all or some of these modules may be integrated together, or may be implemented independently. The processing element herein may be an integrated circuit and has a signal processing capability. In an implementation process, steps in the foregoing methods or the foregoing modules may be completed using a hardware integrated logical circuit in the processing element, or using instructions in a form of software.

For example, the foregoing modules may be configured as one or more integrated circuits for implementing the foregoing method, such as one or more application-specific integrated circuits (ASICs), one or more microprocessors (e.g., a digital signal processor (DSP)), or one or more field-programmable gate arrays (FPGAs). For another example, when one of the foregoing modules is implemented in a form of scheduling program code by a processing element, the processing element may be a general-purpose processor, for example, a central processing unit (CPU) or another processor that can invoke the program code. For another example, these modules may be integrated together and implemented in a form of a system-on-a-chip (SOC).

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a readable storage medium or may be transmitted from a readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk, solid-state drive (SSD), etc.), or the like.

Figure 15:
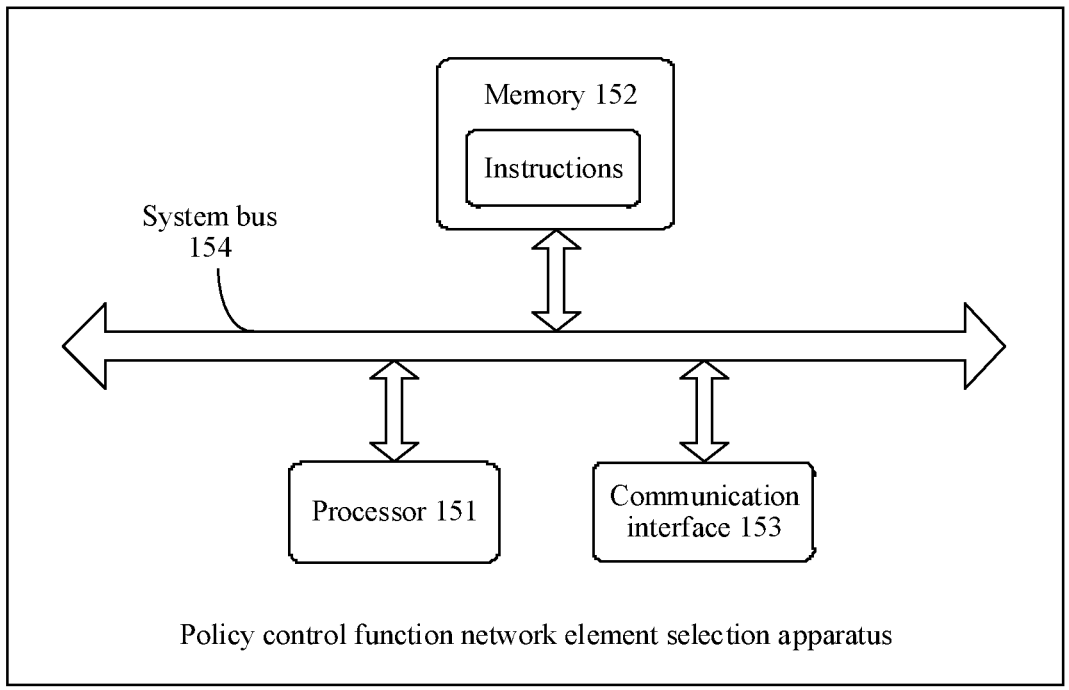
FIG. 15 is a schematic diagram of Embodiment 3 of a structure of a policy control function network element selection apparatus according to an embodiment of this application.

FIG. 15 is a schematic diagram of Embodiment 3 of a structure of a policy control function network element selection apparatus according to an embodiment of this application. The apparatus may be integrated into a second access and mobility management function network element, or may be implemented through a second access and mobility management function network element. As shown in FIG. 15, the apparatus may include a processor 151, a memory 152, a communication interface 153, and a system bus 154. The memory 152 and the communication interface 153 are connected to the processor 151 and communicate with each other through the system bus 154. The memory 152 is configured to store computer-executable instructions. The communication interface 153 is configured to communicate with another device. When executing the computer-executable instructions, the processor 151 implements implementation solutions of the first access and mobility management function network element in the method embodiments shown in FIG. 5 to FIG. 11A to FIG. 11C.

Figure 16:
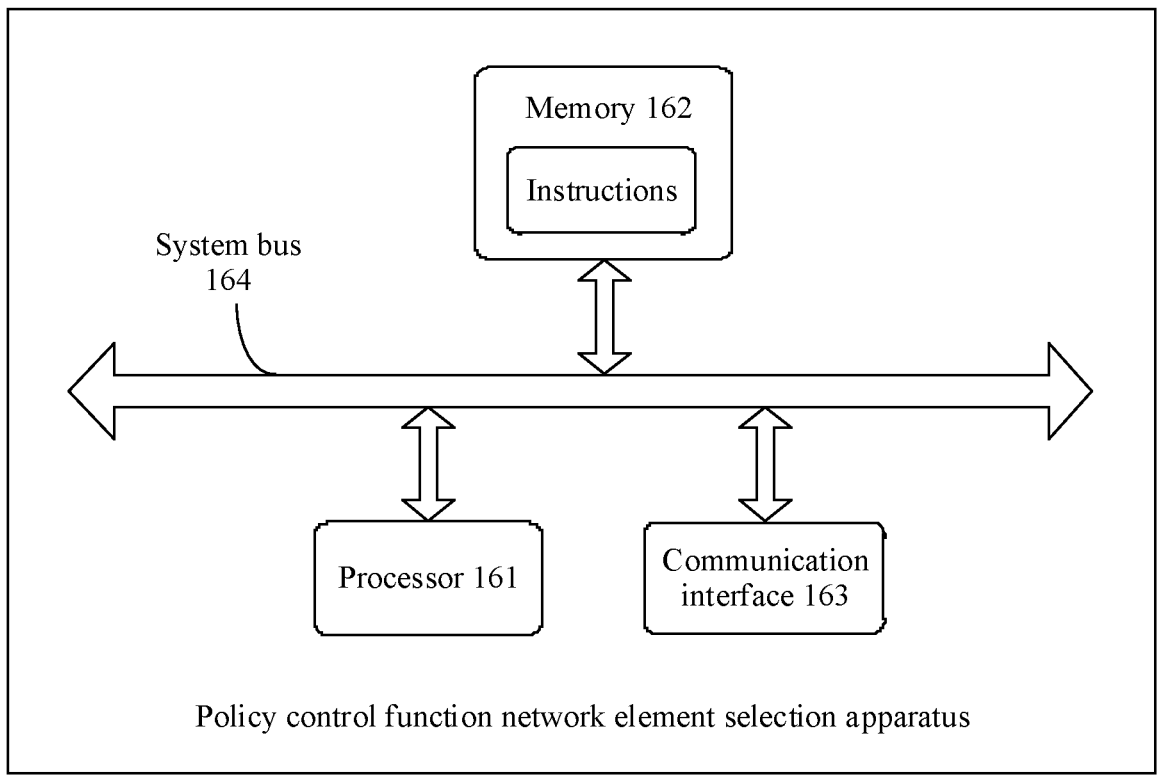
FIG. 16 is a schematic diagram of Embodiment 4 of a structure of a policy control function network element selection apparatus according to an embodiment of this application.

FIG. 16 is a schematic diagram of Embodiment 4 of a structure of a policy control function network element selection apparatus according to an embodiment of this application. The apparatus may be integrated into a second access and mobility management function network element, or may be implemented through a second access and mobility management function network element. As shown in FIG. 16, the apparatus may include a processor 161, a memory 162, a communication interface 163, and a system bus 164. The memory 162 and the communication interface 163 are connected to the processor 161 and communicate with each other through the system bus 164. The memory 162 is configured to store computer-executable instructions. The communication interface 163 is configured to communicate with another device. When executing the computer-executable instructions, the processor 161 implements implementation solutions of the second access and mobility management function network element in the method embodiments shown in FIG. 5 to FIG. 11A to FIG. 11C.

Figure 17:
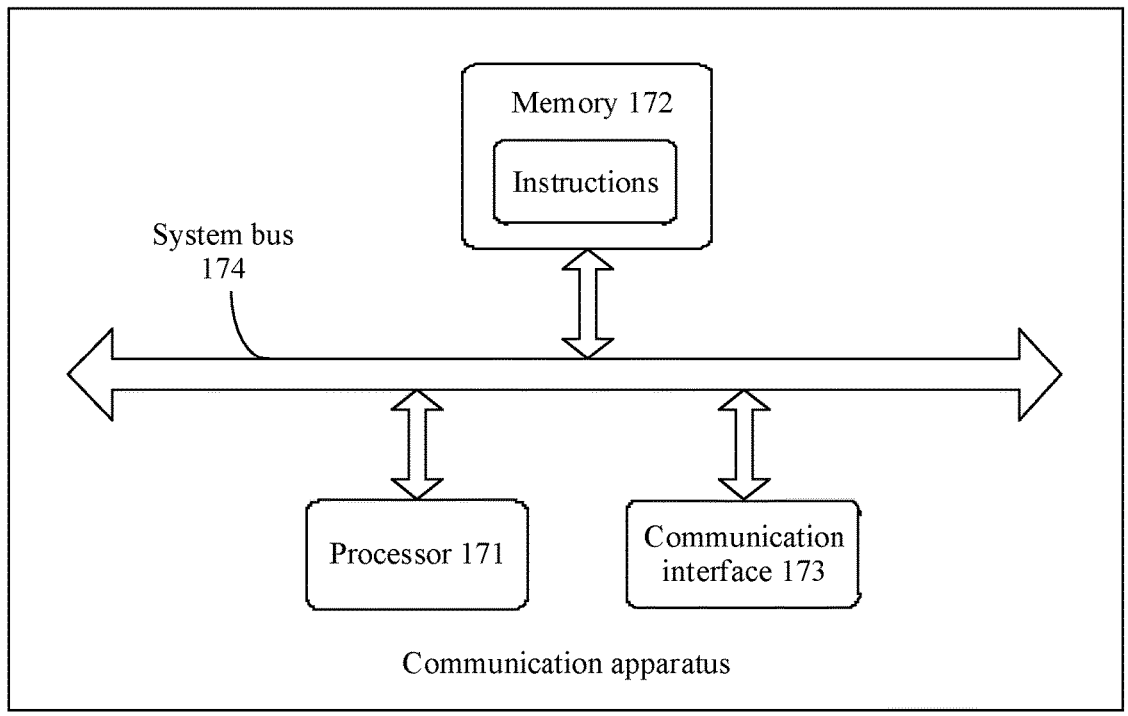
FIG. 17 is a schematic diagram of Embodiment 2 of a structure of a communication apparatus according to an embodiment of this application.

FIG. 17 is a schematic diagram of Embodiment 2 of a structure of a communication apparatus according to an embodiment of this application. The apparatus may be integrated into a terminal device, or may be implemented through a terminal device. As shown in FIG. 17, the apparatus may include a processor 171, a memory 172, a communication interface 173, and a system bus 174. The memory 172 and the communication interface 173 are connected to the processor 171 and communicate with each other through the system bus 174. The memory 172 is configured to store computer-executable instructions. The communication interface 173 is configured to communicate with another device. When executing the computer-executable instructions, the processor 171 implements implementation solutions of the terminal device in the method embodiments shown in FIG. 5 to FIG. 11A to FIG. 11C.

The system bus mentioned in FIG. 15, FIG. 16, and FIG. 17 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communication interface is configured to implement communication between a database access apparatus and another device (such as a client, a read/write database, or a read-only database). The memory may include a random-access memory (RAM), or may further include a non-volatile memory, for example, at least one magnetic disk memory.

The processor may be a general-purpose processor including a central processing unit CPU, a network processor (NP), or the like; or may be a DSP, an ASIC, an FPGA or another programmable logic device, a discrete gate or a transistor logic device, or a discrete hardware component.

Optionally, an embodiment of this application provides a storage medium. The storage medium stores instructions. When the instructions are run on a computer, the computer is enabled to perform the implementation solutions of the first access and mobility management function network element in the method embodiments shown in FIG. 5 to FIG. 11A to FIG. 11C.

Optionally, an embodiment of this application further provides a storage medium. The storage medium stores instructions. When the instructions are run on a computer, the computer is enabled to perform the implementation solutions of the second access and mobility management function network element in the method embodiments shown in FIG. 5 to FIG. 11A to FIG. 11C.

Optionally, an embodiment of this application further provides a storage medium. The storage medium stores instructions. When the instructions are run on a computer, the computer is enabled to perform the implementation solutions of the terminal device in the method embodiments shown in FIG. 5 to FIG. 11A to FIG. 11C.

Optionally, an embodiment of this application further provides a chip for running instructions. The chip is configured to perform the implementation solutions of the first access and mobility management function network element in the method embodiments shown in FIG. 5 to FIG. 11A to FIG. 11C.

Optionally, an embodiment of this application further provides a chip for running instructions. The chip is configured to perform the implementation solutions of the second access and mobility management function network element in the method embodiments shown in FIG. 5 to FIG. 11A to FIG. 11C.

Optionally, an embodiment of this application further provides a chip for running instructions. The chip is configured to perform the implementation solutions of the terminal device in the method embodiments shown in FIG. 5 to FIG. 11A to FIG. 11C.

An embodiment of this application further provides a program product. The program product includes a computer program, the computer program is stored in a storage medium, and at least one processor may read the computer program from the storage medium. When executing the computer program, the at least one processor may implement the implementation solutions of the first access and mobility management function network element in the method embodiments shown in FIG. 5 to FIG. 11A to FIG. 11C.

An embodiment of this application further provides a program product. The program product includes a computer program, the computer program is stored in a storage medium, and at least one processor may read the computer program from the storage medium. When executing the computer program, the at least one processor may implement the implementation solutions of the second access and mobility management function network element in the method embodiments shown in FIG. 5 to FIG. 11A to FIG. 11C.

An embodiment of this application further provides a program product. The program product includes a computer program, the computer program is stored in a storage medium, and at least one processor may read the computer program from the storage medium. When executing the computer program, the at least one processor may implement the implementation solutions of the terminal device in the method embodiments shown in FIG. 5 to FIG. 11A to FIG. 11C.

Figure 18:
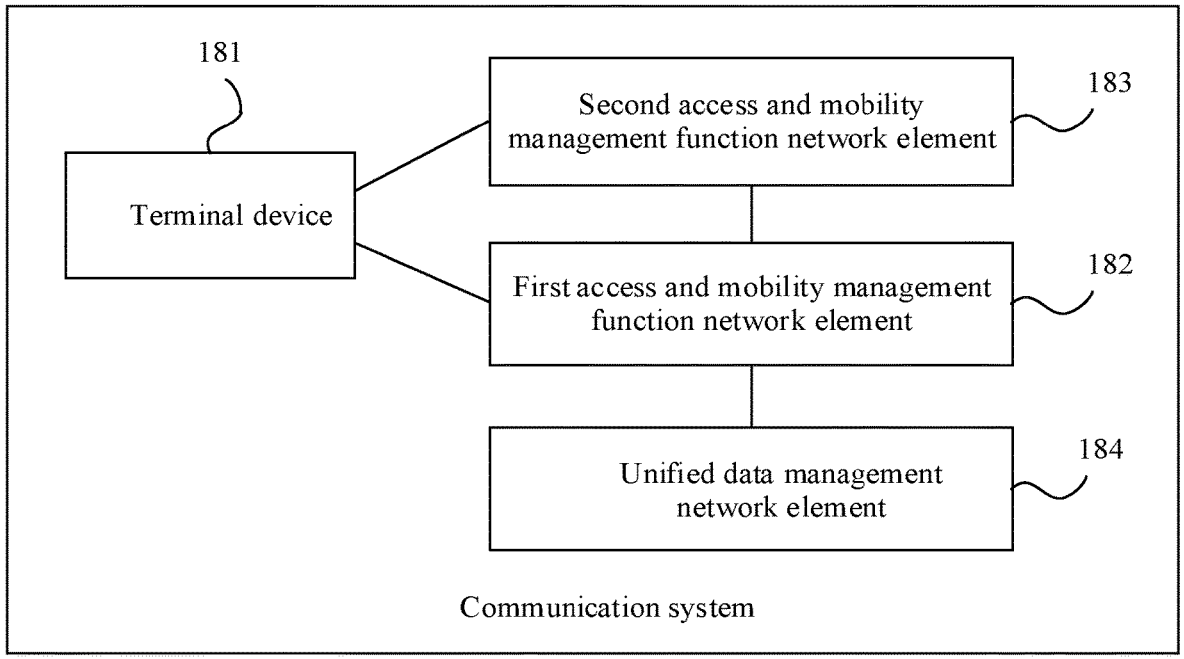
FIG. 18 is a schematic diagram of an embodiment of a structure of a communication system according to an embodiment of this application.

FIG. 18 is a schematic diagram of an embodiment of a structure of a communication system according to an embodiment of this application. As shown in FIG. 18, the communication system may include a first access and mobility management function network element 182 and a second access and mobility management function network element 183, and optionally may further include a unified data management network element 184, or may further include a terminal device 181. The first access and mobility management function network element 182 is an access and mobility management function network element that is determined by an access network and that is configured to serve the terminal device 181. The second access and mobility management function network element 183 is an access and mobility management function network element that is configured to serve the terminal device 181 before the terminal device 181 requests to access the access network. The unified data management network element 184 is configured to store an identifier of a policy control function network element serving the terminal device 181 and a network identifier of the policy control function network element.

In this embodiment of this application, the first access and mobility management function network element 182 is the policy control function network element selection apparatus in the embodiment shown in FIG. 12 or FIG. 15, the second access and mobility management function network element 183 is the policy control function network element selection apparatus in the embodiment shown in FIG. 13 or FIG. 16, and the terminal device 181 is the communication apparatus in the embodiment shown in FIG. 14 or FIG. 17.

In this embodiment, a deregistration procedure is performed between the second access and mobility management function network element 183 and the terminal device 181, and the first access and mobility management function network element 182 interacts with the terminal device 181, and determines, based on a network identifier of the first access and mobility management function network element and the obtained network identifier of the policy control function network element, a target policy control function network element serving the terminal device.

In this embodiment, for implementations of the terminal device 181, the first access and mobility management function network element 182, and the second access and mobility management function network element 183, refer to records in the foregoing method embodiments. Details are not described herein again.

In this application, "at least one" refers to one or more, and "a plurality of" refers to two or more. The term "and/or" describes an association relationship for describing associated objects and represents that three relationships may exist. For example, A and/or B may indicate the following cases: A exists alone, both A and B exist, and B exists alone, where A and B may be singular or plural. The character "/" generally indicates an "or" relationship between the associated objects. In a formula, the character "/" indicates a "division" relationship between the associated objects. "At least one of the following items (pieces)" or a similar expression thereof means any combination of these items, including any combination of singular items (pieces) or plural items (pieces). For example, at least one of a, b, or c may represent a, b, c, a and b, a and c, b and c, or a, b, and c, where a, b, and c may be singular or plural.

It may be understood that numerals in the embodiments of this application are used for differentiation merely for ease of description, but are not used to limit the scope of the embodiments of this application. In the embodiments of this application, sequence numbers of the processes do not mean execution sequences. The execution sequences of the processes should be determined based on functions and internal logic of the processes, and should not constitute any limitation on the implementation processes in the embodiments of this application.

What is claimed is:

1. A method, comprising:
receiving, by an access and mobility management function network element, a registration request message from a terminal device, wherein the registration request message comprises a first identifier of the terminal device;
obtaining, by the access and mobility management function network element based on the first identifier of the terminal device and received from a unified data management network element, a second identifier of a policy control function network element currently serving the terminal device and a first network identifier of the policy control function network element; and
determining, by the access and mobility management function network element, that the policy control function network element is a target policy control function network element in response to determining a second network identifier of the access and mobility management function network element being consistent with the first network identifier of the policy control function network element received from the unified data management network element.

2. The method of claim 1, wherein the access and mobility management function network element is selected by an access network to serve the terminal device.

3. The method of claim 1, further comprising sending, by the unified data management network element, the second identifier and the first network identifier to the access and mobility management function network element.

4. The method of claim 1, wherein receiving the registration request message comprises receiving, by the access and mobility management function network element, the registration request message from the terminal device through an access network.

5. The method of claim 1, wherein the first network identifier of the policy control function network element comprises a public land mobile network identifier, and wherein determining the second network identifier of the access and mobility management function network element is consistent with the first network identifier of the policy control function network element from the unified data management network element comprises determining that a public land mobile network identifier of the access and mobility management function network element is consistent with the public land mobile network identifier of the policy control function network element.

6. The method of claim 1, wherein before obtaining the second identifier of the policy control function network element and the first network identifier of the policy control function network element comprises selecting the unified data management network element.

7. The method of claim 6, further comprising registering with the unified data management network element and obtaining subscription information.

8. An access and mobility management function network element, comprising:
- a memory configured to store instructions; and
- one or more processors coupled to the memory and configured to execute the instructions to:
  - receive a registration request message from a terminal device, wherein the registration request message comprises a first identifier of the terminal device;
  - obtain, based on the first identifier of the terminal device and received from a unified data management network element, a second identifier of a policy control function network element serving the terminal device and a first network identifier of the policy control function network element; and
  - determine that the policy control function network element is a target policy control function network element in response to a second network identifier of the access and mobility management function network element being consistent with the first network identifier of the policy control function network element received from the unified data management network element.

9. The access and mobility management function network element of claim 8, wherein the access and mobility management function network element is selected by an access network to serve the terminal device.

10. The access and mobility management function network element of claim 8, wherein the one or more processors are further configured to execute the instructions to receive the registration request message from the terminal device through an access network.

11. A system, comprising:
- an access and mobility management function network element configured to:
  - receive a registration request message from a terminal device, wherein the registration request message comprises a first identifier of the terminal device;
  - obtain, based on the first identifier of the terminal device and received from a unified data management network element, a second identifier of a policy control function network element serving the terminal device and a first network identifier of the policy control function network element; and
  - determine that the policy control function network element is a target policy control function network element in response to determining a second network identifier of the access and mobility management function network element being consistent with the first network identifier of the policy control function network element received from the unified data management network element; and
- the unified data management network element configured to send the second identifier and the first network identifier to the access and mobility management function network element.

12. The system of claim 11, wherein the access and mobility management function network element is selected by an access network to serve the terminal device.

13. The system of claim 11, wherein the access and mobility management function network element is configured to receive the registration request message from the terminal device through an access network.

14. The system of claim 12, further comprising the access network, wherein the access network is configured to select the access and mobility management function network element to serve the terminal device.

15. The system of claim 13, further comprising the access network, wherein the access network is configured to send the registration request message to the access and mobility management function network element.

16. A method, comprising:
- receiving, by an access and mobility management function network element, a registration request message from a terminal device, wherein the registration request message comprises a first identifier of the terminal device;
- obtaining, by the access and mobility management function network element based on the first identifier of the terminal device and received from a unified data management network element, a second identifier of a policy control function network element currently serving the terminal device and a first network identifier of the policy control function network element;
- sending, by the unified data management network element, the second identifier and the first network identifier to the access and mobility management function network element; and
- determining, by the access and mobility management function network element, that the policy control function network element is a target policy control function network element in response to determining a second network identifier of the access and mobility management function network element being consistent with the first network identifier of the policy control function network element received from the unified data management network element.

17. The method of claim 16, wherein the access and mobility management function network element is selected by an access network to serve the terminal device.

18. The method of claim 16, wherein receiving the registration request message from the terminal device comprises receiving, by the access and mobility management function network element, the registration request message through an access network.

19. The method of claim 17, further comprising selecting, by the access network, the access and mobility management function network element to serve the terminal device.

20. The method of claim 18, further comprising sending, by the access network, the registration request message to the access and mobility management function network element.

* * * * *